(12) United States Patent
Nomura

(10) Patent No.: US 7,764,429 B2
(45) Date of Patent: Jul. 27, 2010

(54) LENS ARRAY, A LINE HEAD AND AN IMAGE FORMING APPARATUS USING THE LINE HEAD

(75) Inventor: Yujiro Nomura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 274 days.

(21) Appl. No.: 12/146,307

(22) Filed: Jun. 25, 2008

(65) Prior Publication Data

US 2009/0009875 A1 Jan. 8, 2009

(30) Foreign Application Priority Data

Jul. 6, 2007 (JP) ............... 2007-178059
Mar. 12, 2008 (JP) ............... 2008-062697

(51) Int. Cl.
*G02B 27/10* (2006.01)
*B41J 15/14* (2006.01)
*B41J 2/45* (2006.01)

(52) U.S. Cl. ............... 359/621; 359/619; 359/626; 347/238; 347/241; 347/242; 347/244; 399/51; 399/218; 399/220; 399/221

(58) Field of Classification Search ......... 359/619–622, 359/626, 443, 456; 362/311.06, 362; 399/51, 399/218, 220, 221; 347/236–238, 241, 242, 347/255; 358/494, 471
See application file for complete search history.

(56) References Cited

U.S. PATENT DOCUMENTS 4,435,064 A   3/1984   Tsukada et al.
4,512,632 A   4/1985   Tokumitsu et al.
5,398,125 A * 3/1995   Willett et al. ............ 349/95
5,444,520 A * 8/1995   Murano .................. 399/221
5,648,874 A   7/1997   Sawaki et al.
5,896,162 A * 4/1999   Taniguchi ............... 347/244
6,330,017 B1  12/2001  Suzuki
6,381,071 B1* 4/2002   Dona et al. ............. 359/621
6,381,072 B1* 4/2002   Burger .................. 359/622
6,545,811 B1* 4/2003   Fujimoto ............... 359/619
6,646,807 B2* 11/2003  Yoshikawa et al. ........ 359/619

FOREIGN PATENT DOCUMENTS

| | | |
|---|---|---|
| EP | 0 348 003 A2 | 12/1989 |
| FR | 2891060 A | 3/2007 |
| JP | 56074207 A | 6/1981 |
| JP | 56161510 A | 12/1981 |
| JP | 60015622 A | 1/1985 |
| JP | 62055973 A | 3/1987 |
| JP | 02-004546 | 1/1990 |
| JP | 05080420 A | 4/1993 |
| JP | 06-208006 | 7/1994 |
| JP | 07040593 A | 2/1995 |
| JP | 11041410 A | 2/1999 |
| JP | 11048526 A | 2/1999 |
| JP | 2005-276849 | 10/2005 |
| JP | 2006256028 A | 9/2006 |

* cited by examiner

*Primary Examiner*—Loha Ben
(74) *Attorney, Agent, or Firm*—Hogan Lovells US LLP

(57) ABSTRACT

A lens array, includes: a plurality of lens substrates which include a plurality of lenses arranged in a first direction; and a support member which supports the plurality of lens substrates arranged in the first direction.

20 Claims, 17 Drawing Sheets

LENS ARRAY, A LINE HEAD AND AN IMAGE FORMING APPARATUS USING THE LINE HEAD

CROSS REFERENCE TO RELATED APPLICATION

The disclosure of Japanese Patent Applications No. 2007-178059 filed on Jul. 6, 2007 and No. 2008-062697 filed on Mar. 12, 2008 including specification, drawings and claims is incorporated herein by reference in its entirety.

BACKGROUND

1. Technical Field

The invention relates to a lens array used in a line head, a line head for scanning a surface-to-be-scanned of a latent image carrier with light, and an image forming apparatus.

2. Related Art

A line head which scans light across a surface-to-be-scanned of a photosensitive member which is a latent image carrier to form a latent image is used as a light source for an electrophotographic printer which is an image forming apparatus. Among proposed as an LED (light emitting diode) print head which is a line head is one described in JP-A-2-4546 which uses a light emitting element group (that is, what is referred to as an "LED array chip" in JP-A-2-4546) which is formed by an arrangement of a plurality of LEDs which are light emitting elements. In JP-A-2-4546, one imaging lens focuses a plurality of luminous dot images on a photosensitive member. Known as a manufacturing method of a microlens array which is an imaging lens corresponding to an LED array chip includes a method of forming a mold by photolithography and electroforming and forming lenses on a glass substrate using a photoresist (JP-A-2005-276849). Also known is a method of forming microlens arrays on the both surfaces of a glass substrate (JP-A-6-208006).

SUMMARY

Light emitting element groups are arranged in a line head in such a manner that the longitudinal direction thereof is a main scanning direction. A long microlens array is necessary to cover the light emitting element groups. While a long mold is needed to form a long microlens array, it is difficult to accurately make a long mold which contains holes corresponding to numerous imaging lenses. To be particularly noted, processing of the molds is usually machining with a sculptured surface processing machine when lens surfaces are shaped as aspheric surfaces. In this instance, the only way to form the lens surfaces is to finish the lens surfaces one by one, which demands a long processing time. To add to the difficulty, it is necessary to exchange a cutting or grinding tool during the processing and the accuracy of relative position of the lenses to each other worsens at the time of exchange.

An advantage of some aspects of the invention is to solve the problems above at least partially.

According to a first aspect of the invention, there is provided a lens array, comprising: a plurality of lens substrates which include a plurality of lenses arranged in a first direction; and a support member which supports the plurality of lens substrates arranged in the first direction.

According to a second aspect of the invention, there is provided a line head, comprising: a head substrate which includes a plurality of light emitting element groups each of which is a group of a plurality of light emitting elements; and a lens array which includes a plurality of lens substrates which include a plurality of lenses arranged in a first direction and for each light emitting element group, and a support member which supports the plurality of lens substrates arranged in the first direction.

According to a third aspect of the invention, there is provided a line head, comprising: a head substrate which includes a plurality of light emitting element groups each of which is a group of a plurality of light emitting elements; a lens array which includes a plurality of lens substrates arranged in a first direction which include a plurality of lenses arranged in the first direction and for each light emitting element group; and a shielding member which is disposed between the lens array and the head substrate, includes light guiding holes which extend from the light emitting element groups toward the lenses, and supports the plurality of lens substrates arranged in the first direction.

According to a fourth aspect of the invention, there is provided an image forming apparatus, comprising: a latent image carrier; a head substrate which includes a plurality of light emitting element groups each of which is a group of a plurality of light emitting elements; and a lens array which includes a plurality of lens substrates which include a plurality of lenses arranged in a first direction and for each light emitting element group, and a support member which supports the plurality of lens substrates arranged in the first direction, the lenses focusing light from the light emitting elements to form spots on a surface of the latent image carrier.

According to a fifth aspect of the invention, there is provided an image forming apparatus, comprising: a latent image carrier; a head substrate which includes a plurality of light emitting element groups each of which is a group of a plurality of light emitting elements; a lens array which includes a plurality of lens substrates arranged in a first direction which include a plurality of lenses arranged in the first direction and for each light emitting element group; and a shielding member which is disposed between the lens array and the head substrate, includes light guiding holes which extend from the light emitting element groups toward the lenses, and supports the plurality of lens substrates arranged in the first direction, the lenses focusing light from the light emitting elements to form spots on a surface of the latent image carrier.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EXEMPLARY EMBODIMENTS

Hereinafter, embodiments are described with reference to the drawings.

First Embodiment

Figure 1:
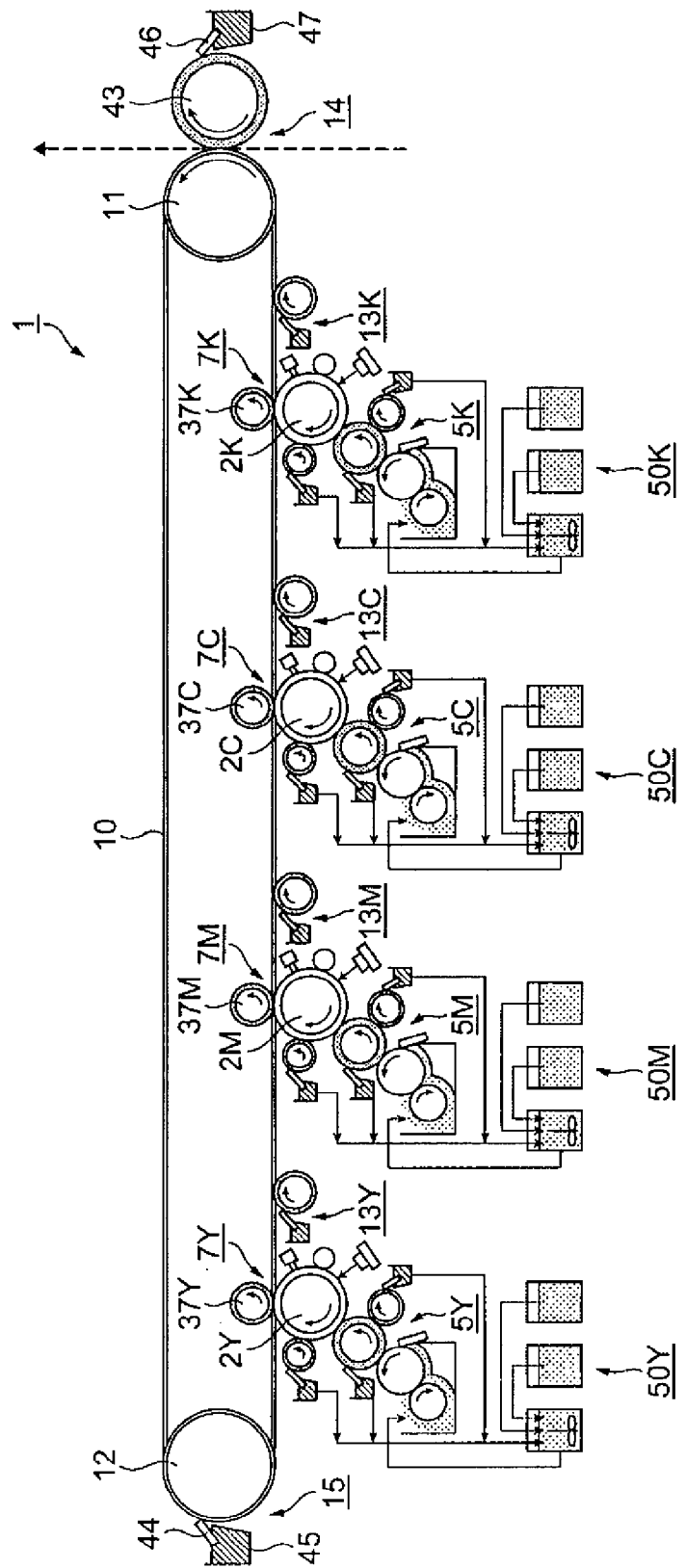
FIG. 1 is a diagram schematically and partly showing an image forming apparatus according to a first embodiment.

FIG. 1 is a diagram schematically and partly showing an image forming apparatus 1 according to a first embodiment. An image forming apparatus 1 is an apparatus for forming an image using a liquid developer, in which toner particles are dispersed in a liquid carrier. It should be noted that rotating directions are shown by solid-line arrows in rotational members.

In FIG. 1, the image forming apparatus 1 includes an endless intermediate transfer belt 10 as an intermediate transfer medium, a drive roller 11 and a driven roller 12 on which the intermediate transfer belt 10 is mounted, a secondary transfer device 14, an intermediate transfer belt cleaning device 15 and primary transfer units. The secondary transfer device 14 is disposed at a side of the intermediate transfer belt 10 toward the drive roller 11, and the intermediate transfer belt cleaning device 15 is disposed at a side of the intermediate transfer belt 10 toward the driven roller 12. The primary transfer units include primary transfer units 50Y, 50M, 50C and 50K corresponding to the respective colors of yellow (Y), magenta (M), cyan (C) and black (K). In the following description, Y, M, C and K indicating the respective colors are affixed to the reference numerals of devices, members and the like corresponding to the respective colors.

Although not shown, the image forming apparatus 1 includes a transfer material storage device for storing transfer materials such as sheets and a pair of rollers for feeding and conveying a transfer material from the transfer material storage device to the secondary transfer device 14 at a side upstream of the secondary transfer device 14 in a transfer material conveying direction similar to a conventional general image forming apparatus for performing a secondary transfer In FIG. 1, the conveying direction of the transfer material is shown by a broken-line arrow. This image forming apparatus 1 also includes a fixing device and a discharge tray at a side downstream of the secondary transfer device 14 in the transfer material conveying direction.

In FIG. 1, the intermediate transfer belt 10 is so mounted between a pair of the drive roller 11 and the driven roller 12 spaced apart from each other as to rotate counterclockwise. This intermediate transfer belt 10 is preferably an elastic intermediate transfer belt in order to improve the transfer efficiency of the secondary transfer to transfer materials such as sheets. Although the respective primary transfer units 50Y, 50M, 50C and 50K are successively arranged in this order from an upstream side in the rotating direction of the intermediate transfer belt 10 in the image forming apparatus 1, the arrangement order of the colors Y, M, C and K can be arbitrarily set. It should be noted that the intermediate transfer belt 10 can be replaced by an intermediate transfer drum.

The secondary transfer device 14 includes a secondary transfer roller 43. This secondary transfer roller 43 is for bringing a transfer material such as a sheet into contact with the intermediate transfer belt 10 mounted on the drive roller 11 to transfer a color toner image, in which toner images of the respective colors are superimposed, on the intermediate transfer belt 10 to the transfer material. In this case, the drive roller 11 also functions as a backup roller at the time of secondary transfer. Further, the secondary transfer device 14 includes a secondary transfer roller cleaner 46 and a secondary transfer roller cleaner collection liquid storage container 47. The secondary transfer roller cleaner 46 is made of an elastic material such as rubber. This secondary transfer roller cleaner 46 is held in contact with the secondary transfer roller 43 to remove the liquid developer residual on the outer surface of the secondary transfer roller 43 after the secondary transfer by scraping the liquid developer off. The secondary transfer roller cleaner collection liquid storage container 47 collects and stores the liquid developer scraped off from the secondary transfer roller 43 by the secondary transfer roller cleaner 46.

The intermediate transfer belt cleaning device 15 includes an intermediate transfer belt cleaner 44 and an intermediate transfer belt cleaner collection liquid storage container 45. The intermediate transfer belt cleaner 44 is held in contact with the intermediate transfer belt 10 to remove the liquid developer residual on the surface of the intermediate transfer belt 10 by scraping it off after the secondary transfer. In this case, the driven roller 12 also functions as a backup roller at the time of cleaning the intermediate transfer belt. This intermediate transfer belt cleaner 44 is made of an elastic material such as rubber. The intermediate transfer belt cleaner collection liquid storage container 45 is for collecting and storing the liquid developer scraped off from the intermediate transfer belt 10 by the intermediate transfer belt cleaner 44.

The respective primary transfer units 50Y, 50M, 50C and 50K include corresponding developing devices 5Y, 5M, 5C and 5K, primary transfer devices 7Y, 7M, 7C and 7K, photosensitive members 2Y, 2M, 2C and 2K as latent image carriers arranged in series. Intermediate transfer belt squeezers 13Y, 13M, 13C and 13K are arranged near and downstream of the respective primary transfer devices 7Y, 7M, 7C and 7K in the rotating direction of the intermediate transfer belt 10.

Any of the respective photosensitive members 2Y, 2M, 2C and 2K is a photosensitive drum in the example shown in FIG. 1. Any of these photosensitive members 2Y, 2M, 2C and 2K is rotated clockwise as shown by solid-line arrows in FIG. 1 during the operation. It should be noted that the respective photosensitive members 2Y, 2M, 2C and 2K may be endless belts. The respective primary transfer devices 7Y, 7M, 7C and 7K include backup rollers 37Y, 37M, 37C and 37K for primary transfer for bringing the intermediate transfer belt 10 into contact with the respective photosensitive members 2Y, 2M, 2C and 2K.

The primary transfer units 50Y, 50M, 50C and 50K are described in detail below, taking the primary transfer unit 50Y as an example. The constituent parts of the primary transfer units 50M, 50C, 50K differ only in the respective colors M, C, K and the constructions and arrangements thereof are the same as those of the primary transfer unit 50Y.

Figure 2:
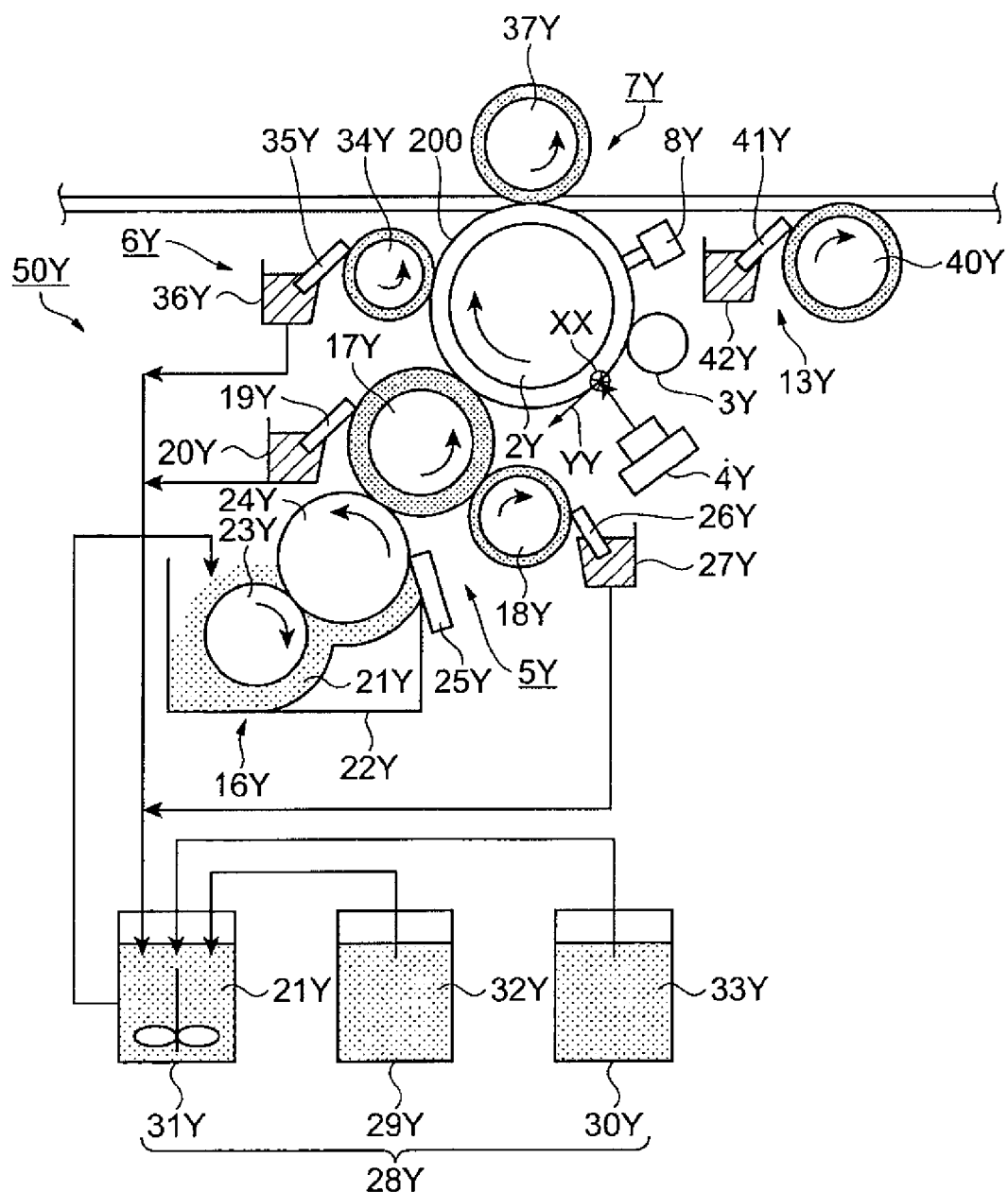
FIG. 2 is a schematic enlarged view of the primary transfer unit.

FIG. 2 is a schematic enlarged view of the primary transfer unit 50Y. Around the photosensitive member 2Y, a charging member 3Y, a line head 4Y as an exposing device, the developing device 5Y, a photosensitive member squeezer 6Y, the primary transfer device 7Y and a discharger 8Y are arranged in this order from an upstream side in the rotating direction.

Figure 3:
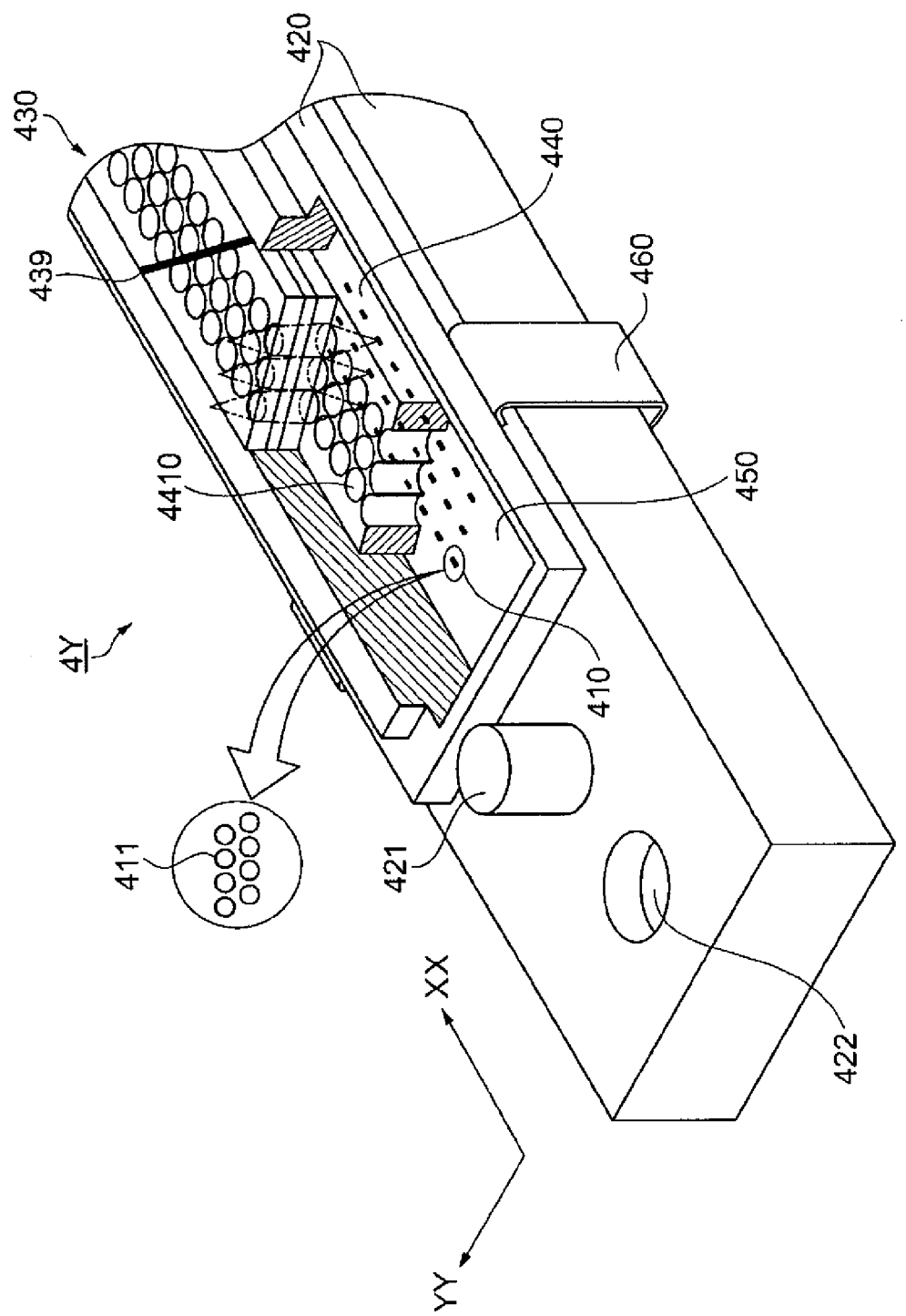
FIG. 3 is a perspective view schematically showing the line head according to this embodiment.
Figure 4:
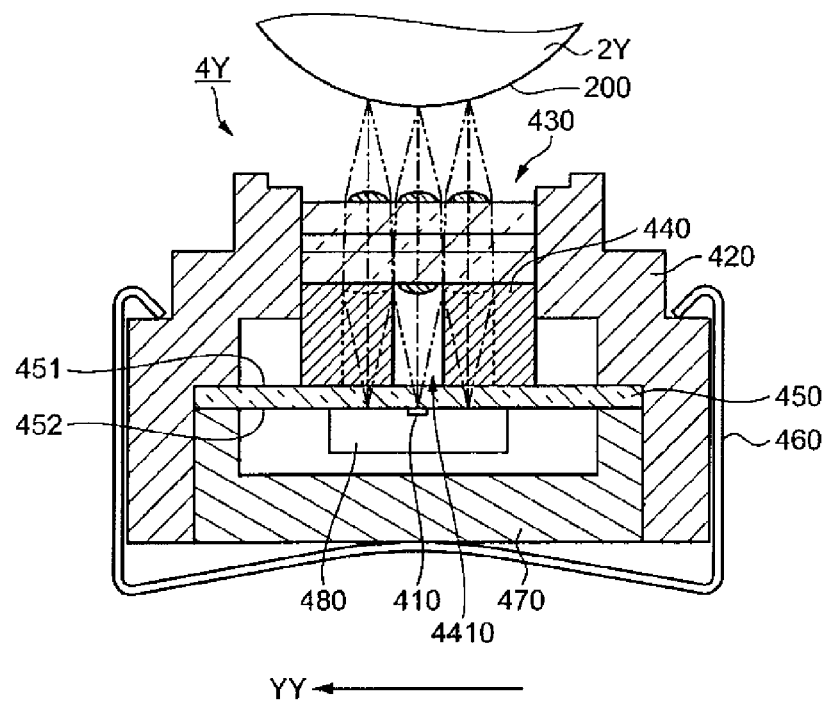
FIG. 4 is a sectional view of the line head in the sub scanning direction.

The charging member 3Y is, for example, a charging roller A bias having the same polarity as the charging polarity of the liquid developer is applied to the charging member 3Y from an unillustrated power supply. The charging member 3Y charges the photosensitive member 2Y. The line head 4Y forms an electrostatic latent image on the charged photosensitive member 2Y by exposing a surface 200 of the photosensitive member 2Y with light from an exposing optical system or the like using, for example, organic EL devices or LEDs. An incident direction of the light is shown by a solid-line arrow drawn from the line head 4Y. The line head 4Y is spaced apart from the photosensitive member 2Y. Scanning directions of the exposing optical system are defined such that a direction normal to the plane of FIG. 2 is a main scanning direction XX and a direction normal to the main scanning direction XX and tangent to the surface 200 of the photosensitive member 2Y to be exposed with the light is a sub scanning direction YY The line head 4Y according to this embodiment is described in detail below with reference to the drawings. FIG. 3 is a perspective view schematically showing the line head 4Y according to this embodiment, and FIG. 4 is a sectional view of the line head 4Y in the sub scanning direction YY. In FIG. 3, the line head 4Y includes light emitting element groups 410 aligned in the main scanning direction XX. Each light emitting element group 410 is comprised of a plurality of light emitting elements 411. Lights are emitted from these light emitting elements 411 to the surface 200 as a surface-to-be-scanned of the photosensitive member 2Y charged by the charging member 3Y as shown in FIG. 2, whereby an electrostatic latent image is formed on the surface 200.

In FIG. 3, the line head 4Y includes a case 420 whose longitudinal direction is the main scanning direction XX, and a positioning pin 421 and a screw insertion hole 422 are provided at each of the opposite ends of such a case 420. The line head 4Y is positioned relative to the photosensitive member 2Y shown in FIG. 2 by fitting such positioning pins 421 into positioning holes (not shown) perforated in an unillustrated photosensitive member cover. The photosensitive member cover covers the photosensitive member 2Y and is positioned relative to the photosensitive member 2Y. Further, the line head 4Y is positioned and fixed relative to the photosensitive member 2Y by screwing fixing screws into screw holes (not shown) of the photosensitive member cover via the screw insertion holes 422.

In FIGS. 3 and 4, the case 420 carries a microlens array 430, in which imaging lenses are arrayed, at a position facing the surface 200 of the photosensitive member 2Y, and is internally provided with a light shielding member 440 and a head substrate 450 as a substrate, the light shielding member 440 being closer to the microlens array 430 than the head substrate 450. The head substrate 450 is a clear glass substrate. A plurality of light emitting element groups 410 are provided on an under surface 452 of the head substrate 450 (surface opposite to a top surface 451 facing the light shielding member 440 out of two surfaces of the head substrate 450). The plurality of light emitting element groups 410 are two-dimensionally arranged on the under surface 452 of the head substrate 450 while being spaced by specified distances in the main scanning direction XX and the sub scanning direction YY as shown in FIG. 3. Here, the light emitting element group 410 is formed by two-dimensionally arraying a plurality of light emitting elements 411 as shown in an encircled part in FIG. 3.

In this embodiment, organic EL devices are used as the light emitting elements. In other words, the organic EL devices are arranged as light emitting elements 411 on the under surface 452 of the head substrate 450 in this embodiment. Lights emitted from the respective plurality of light emitting elements 411 in directions toward the photosensitive member 2Y propagate toward the light shielding member 440 via the head substrate 450. The light emitting elements may be LEDs. In this case, the substrate may not be a glass substrate and the LEDs can be provided on the top surface 451.

In FIGS. 3 and 4, the light shielding member 440 includes a plurality of light guide holes 4410 in a one-to-one correspondence with the plurality of light emitting element groups 410.

In FIGS. 3 and 4, lights emitted from the light emitting elements 411 belonging to the light emitting element group 410 are introduced to the microlens array 430 through the light guide holes 4410 in a one-to-one correspondence with the light emitting element group 410. The lights having passed through the light guide holes 4410 are imaged as spots on the surface 200 of the photosensitive member 2Y by the microlens array 430 as shown by chain double-dashed line.

As shown in FIG. 4, an underside lid 470 is pressed against the case 420 via the head substrate 450 by retainers 460. Specifically, the retainers 460 have elastic forces to press the underside lid 470 toward the case 420, and seal the inside of the case 420 light-tight (that is, so that light does not leak from the inside of the case 420 and so that light does not intrude into the case 420 from the outside) by pressing the underside lid 470 by means of the elastic forces. It should be noted that a plurality of the retainers 460 are provided at a plurality of positions in the longitudinal direction of the case 420 shown in FIG. 3. The light emitting element groups 410 are covered with a sealing member 480.

Figure 5:
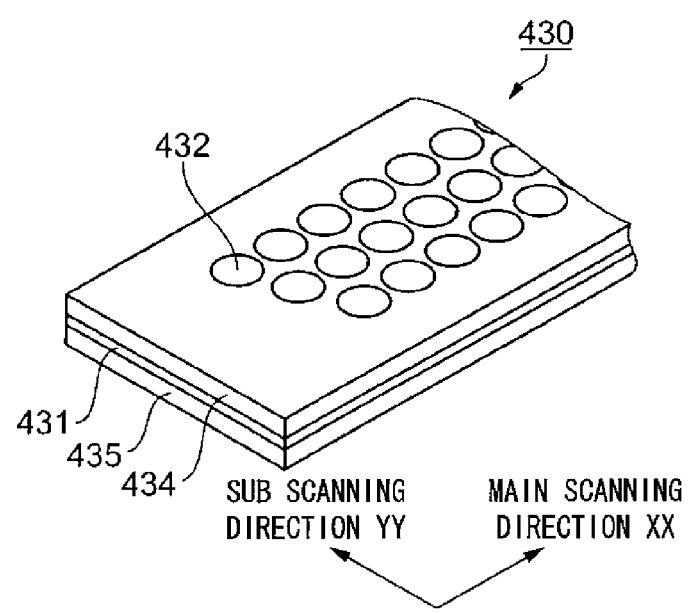
FIG. 5 is a schematic partial perspective view of the microlens array.
Figure 6:
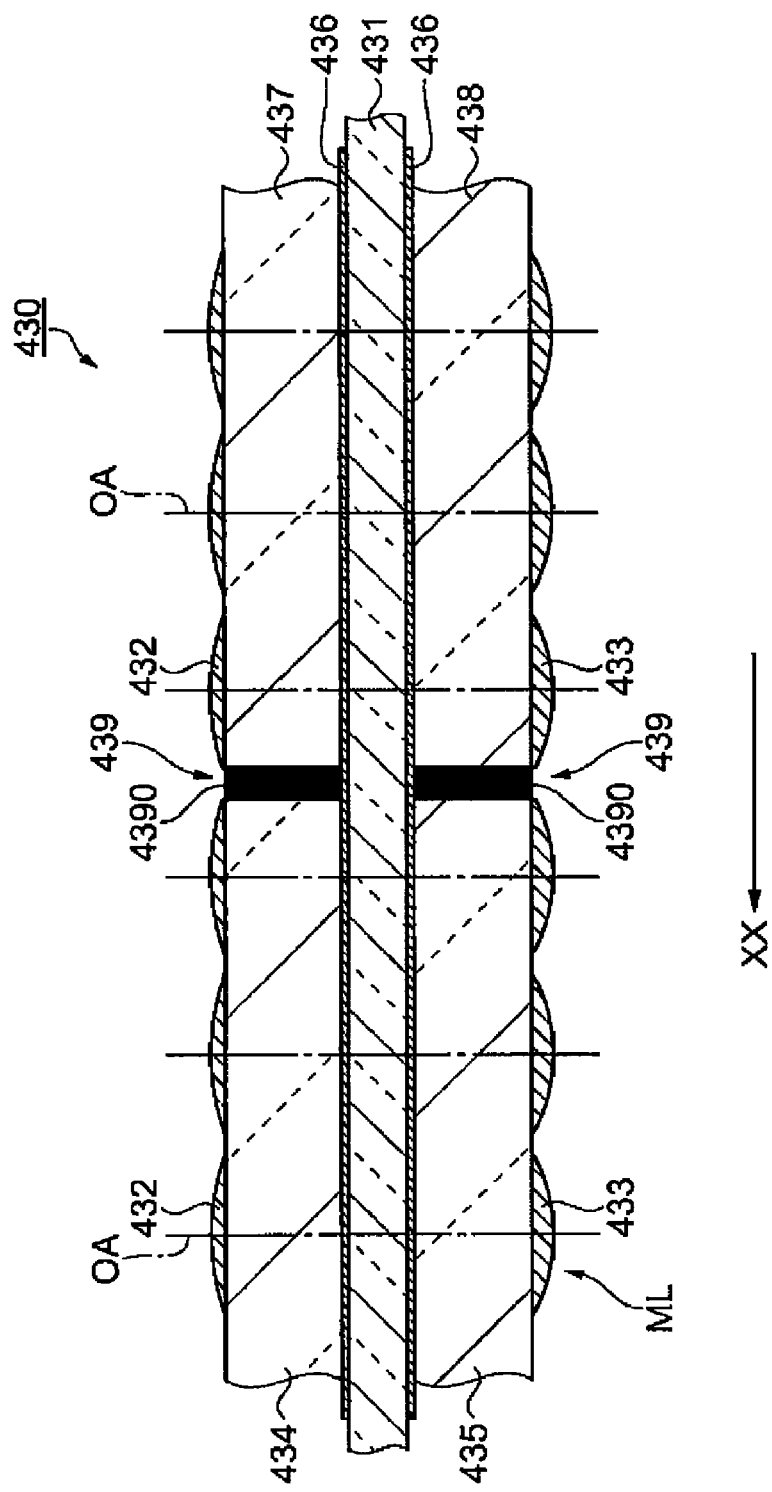
FIG. 6 is a partial cross sectional view of the microlens array taken along the main scanning direction.

FIG. 5 is a schematic partial perspective view of the microlens array 430. FIG. 6 is a partial cross sectional view of the microlens array 430 taken along the main scanning direction XX. In FIGS. 5 and 6, the microlens array 430 comprises a glass substrate 431 which serves as a base substrate and lens substrates 434, 435, 437 and 438. These drawings are partial views and do not show all components. In FIGS. 5 and 6, the lens substrates 434, 437 and the lens substrates 435, 438 are provided on the both surfaces of the glass substrate 431 so as to sandwich the glass substrate 431. A plurality of lenses 432 are formed on the lens substrates 434, 437 and a plurality of lenses 433 are formed on the lens substrates 435, 438. The lenses 432, 433 can be formed with a resin. The two lenses 432 and 433 disposed on a one-to-one correspondence with each other sandwiching the glass substrate 431 constitute a lens pair.

As a method of forming the lenses 432 and 433, a mold including a plurality of concave sections which are shaped approximately the same as the outer shapes of the lenses 432 and 433 is prepared first. With the concave sections filled with a liquid UV cure resin, the lens substrates are laid over so as to cap the concave sections, and UV light is irradiated from the lens substrate side. As the mold is taken off after the UV cure resin has hardened, the lenses 432 and 433 are formed on the lens substrates.

In FIG. 6, the lens substrates 434, 437 are adhered to one surface of the glass substrate 431 and the lens substrates 435, 438 are adhered to the opposed surface, both by an adhesive 436. While the adhesive 436 may be an ultraviolet cure adhesive, a thermosetting adhesive or the like, considering alignment of the glass substrate 431 to the lens substrate 434, etc., an ultraviolet cure adhesive which hardens to UV light after alignment is preferable.

The two lenses 432, 433 constituting the lens pair share an optical axis OA shown by dashed-dotted line in FIG. 6. These plurality of lens pairs are arranged in a one-to-one correspondence with the plurality of light emitting element groups 410 shown in FIG. 3. In this specification, an optical system made up of a one-to-one pair of lenses 432 and 433 and the glass substrate 431 located between such lens pair is called a "microlens ML". The microlenses ML as imaging lenses are two-dimensionally arranged in conformity with the arrangement of the light emitting element groups 410 while being spaced apart by specified distances in the main scanning direction XX and the sub scanning direction YY.

In FIG. 6, gaps 439 are provided among the four mutually adjacent lens substrates, that is, between the lens substrates 434 and 437 and between the lens substrates 435 and 438. The gaps 439 may be filled with a light absorbing material 4390. The light absorbing material 4390 may be resin containing fine carbon particles or the like. The gaps 439 are formed obliquely along the lenses as shown in FIG. 3. Further, the gaps 439 may be formed stretching over the lenses 432 and 433 or not stretching over the lenses 432 and 433. In the event that there is no difference in terms of coefficient of linear expansion between the glass substrate 431 and the lens substrates 434, 437, 435, 438, it is not always necessary to provide the gaps 439.

Figure 7:
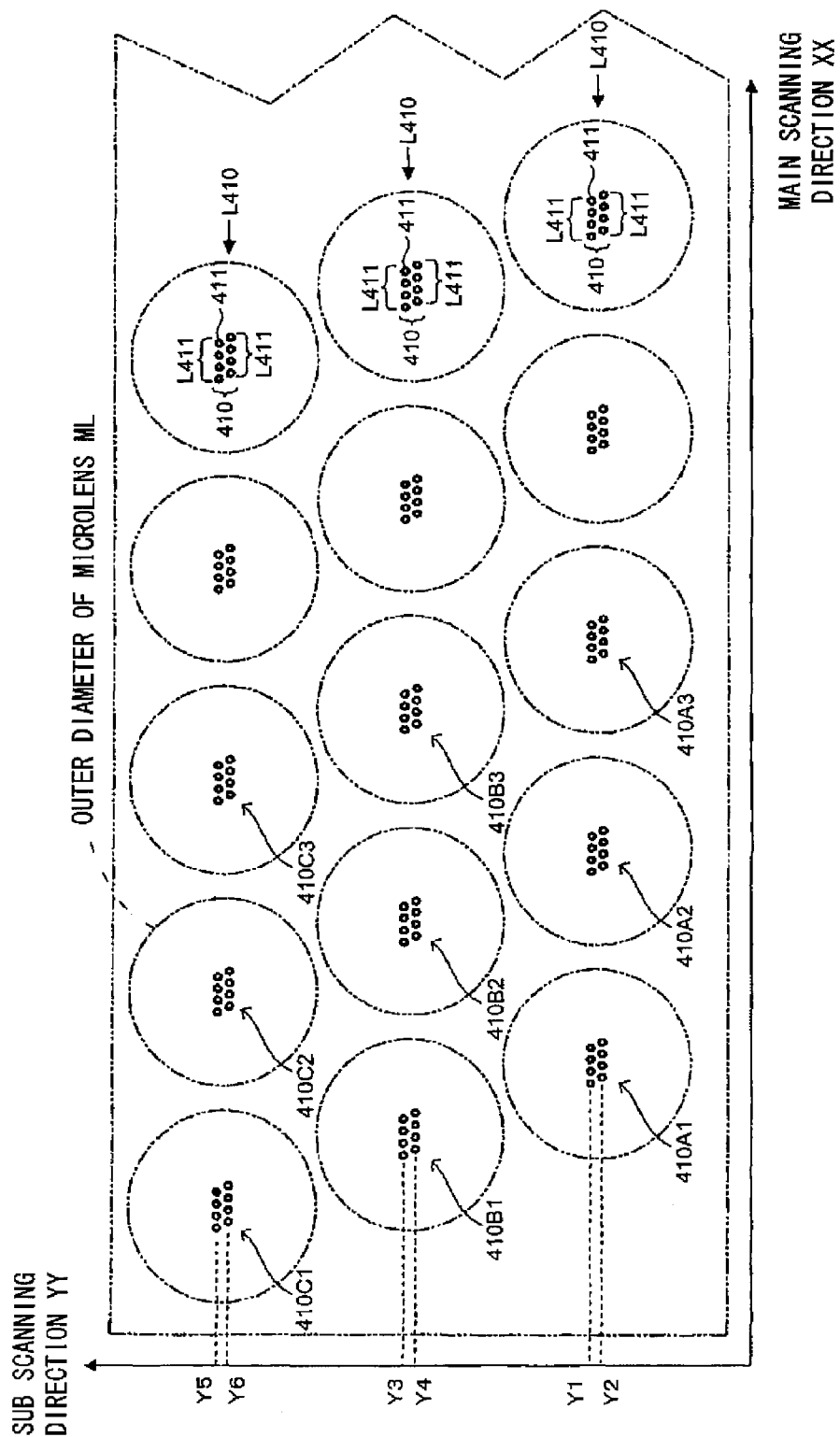
FIG. 7 is a diagram showing the arrangement of the plurality of light emitting element groups.

FIG. 7 is a diagram showing the arrangement of the plurality of light emitting element groups 410. In this embodiment, two light emitting element rows L411, in each of which four light emitting elements 411 are aligned at specified intervals in the main scanning direction XX, are arranged in the sub scanning direction YY to form one light emitting element group 410. In other words, eight light emitting elements 411 constitute the light emitting element group 410 corresponding to a position of the outer diameter of one microlens ML shown by a chain double-dashed line circle in FIG. 7. A plurality of light emitting element groups 410 are arranged as follows.

The light emitting element groups 410 are two-dimensionally arranged such that three light emitting element group rows L410 (group rows), in each of which a specified number (two or larger) of light emitting element groups 410 are aligned in the main scanning direction XX, are arranged in the sub scanning direction YY. The light emitting element groups 410 in each of the light emitting element group rows LA10 are arranged at mutually different main scanning direction positions. Further, the plurality of light emitting element groups 410 are arranged such that the light emitting element groups (light emitting element groups 410C1, 410B1 for instance) adjacent in the main scanning direction mutually differ in their sub scanning direction positions. The main scanning direction position and the sub scanning direction position mean a main scanning direction component and a sub scanning direction component of a target position, respectively.

Figure 8:
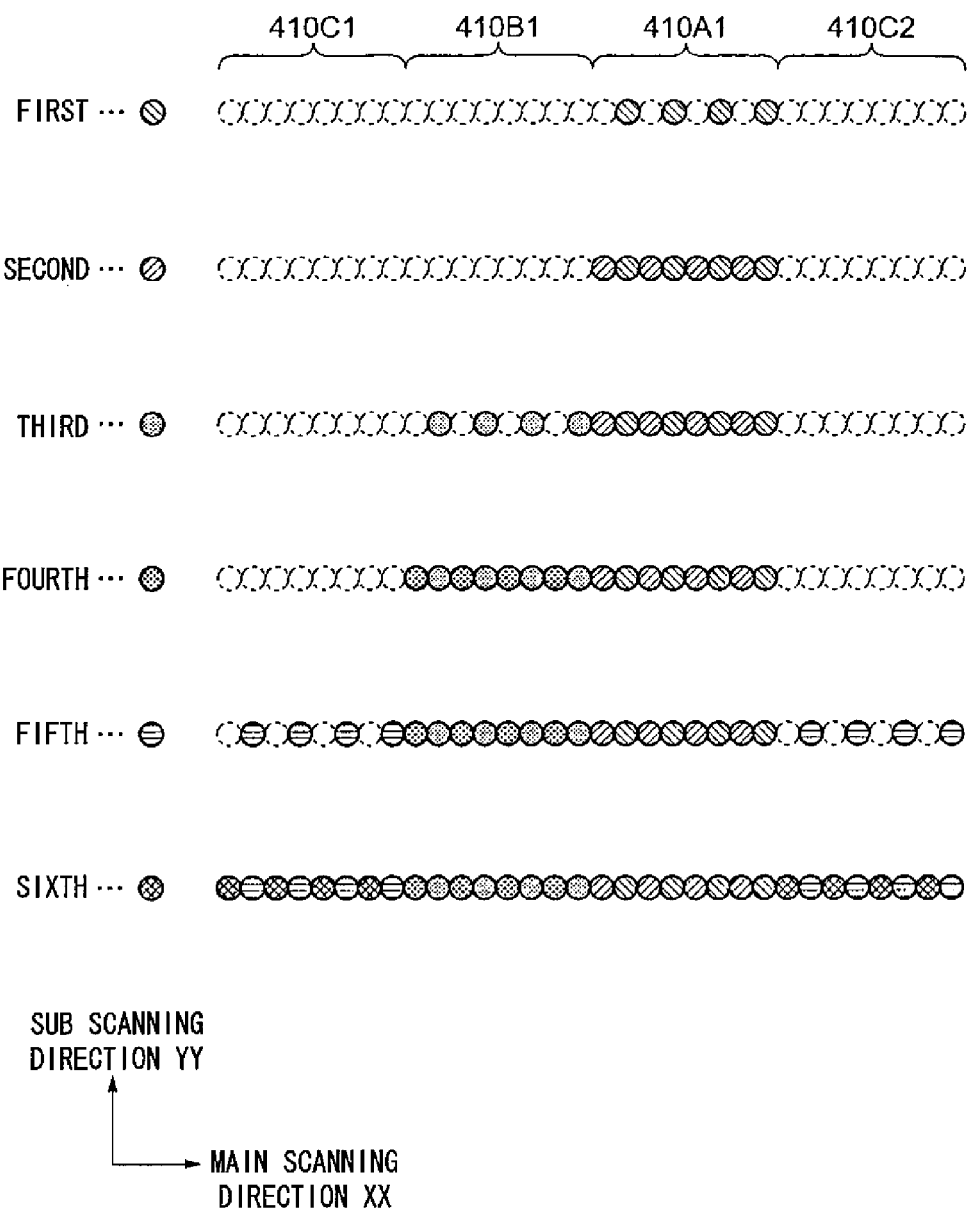
FIG. 8 is a diagram showing a spot forming operation by the line head.

FIG. 8 is a diagram showing a spot forming operation by the line head 4Y. An electrostatic latent image is formed by a collection of spots. The spot forming operation by the line head according to this embodiment is described with reference to FIGS. 7 and 8. In order to facilitate the understanding of the invention, here is described the case where a plurality of spots are aligned on a straight line extending in the main scanning direction XX. In this embodiment, the plurality of spots are formed side by side on the straight line extending in the main scanning direction XX by driving a plurality of light emitting elements 411 to emit lights at specified timings while the surface 200 of the photosensitive member 2Y is conveyed in the sub scanning direction YY.

In FIG. 7, six light emitting element rows L411 are arranged in the sub scanning direction YY corresponding to sub scanning direction positions Y1 to Y6 in the line head 4Y of this embodiment. The light emitting element rows L411 located at the same sub scanning direction position are driven to emit lights substantially at the same timing, and those located at positions different in the sub scanning direction YY are driven to emit lights at mutually different timings. More specifically, the light emitting element rows L411 are driven to emit lights in an order of the sub scanning direction positions Y1 to Y6. By driving the light emitting element rows L411 to emit lights in the above order while the surface 200 of the photosensitive member 2Y is conveyed in the sub scanning direction YY, the plurality of spots are formed side by side on the straight line extending in the main scanning direction XX of the surface 200.

Figure 9:
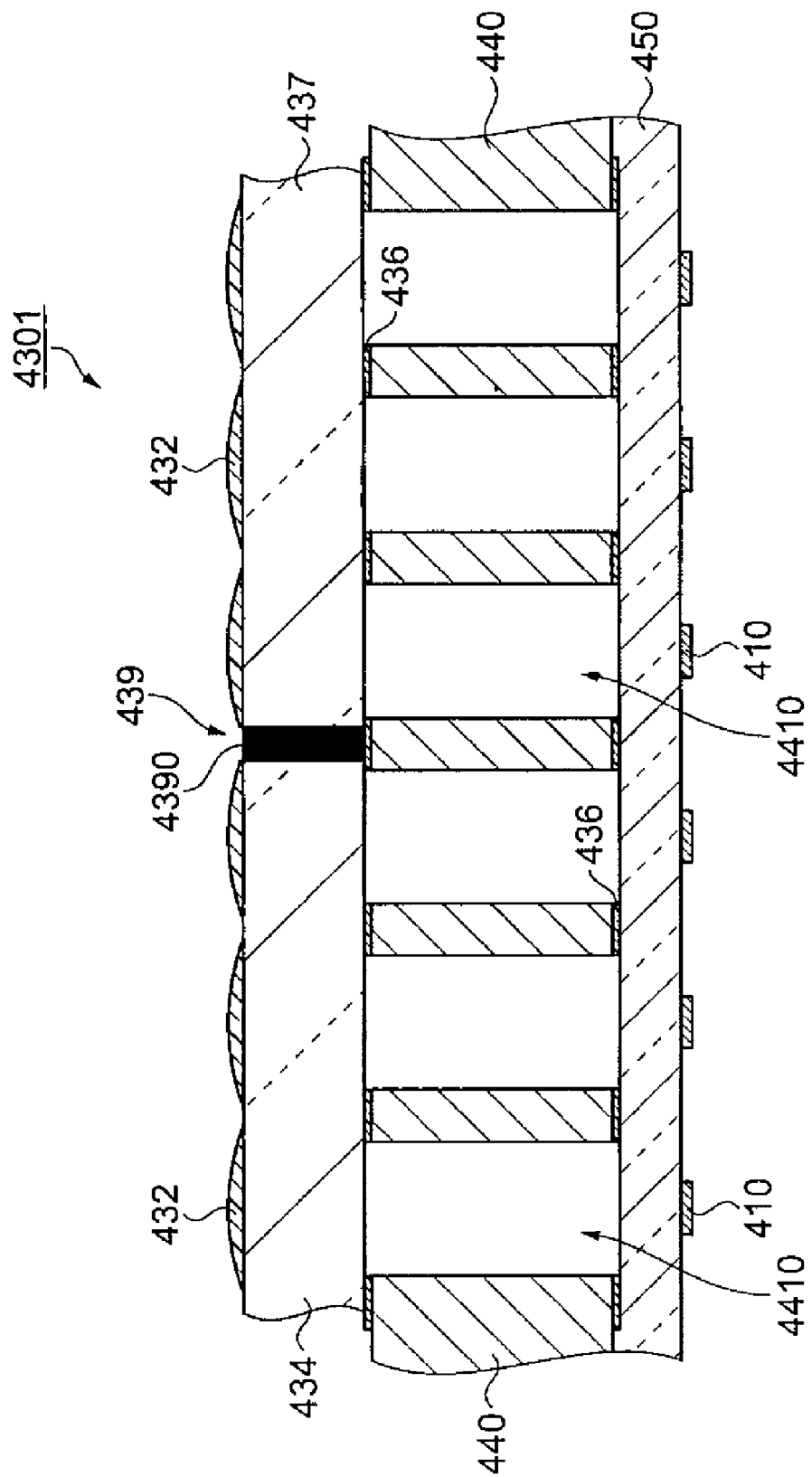
FIG. 9 is a partial cross sectional view in the vicinity of a microlens array and the light shielding member according to a second embodiment.

Such an operation is described with reference to FIGS. 7 and 8. First of all, the light emitting elements 411 of the light emitting element rows L411 at the sub scanning direction position Y1 belonging to the most upstream light emitting element groups 410A1, 410A2, 410A3, . . . in the sub scanning direction YY are driven to emit lights. A plurality of lights emitted by such a light emitting operation are imaged on the surface 200 of the photosensitive member 2Y by the microlenses ML, which are "imaging lenses" having the aforementioned inverting and reducing property, while being inverted and reduced. In other words, spots are formed at hatched positions of the "first" of FIG. 8. In FIG. 8, white circles represent spots that are not formed yet, but planned to be formed later. In FIG. 9, spots labeled by reference numerals 410C1, 410B1, 410A1 and 410C2 are those to be formed by the light emitting element groups 410 corresponding to the respective attached reference numerals.

Subsequently, the light emitting elements 411 of the light emitting element rows L411 at the sub scanning direction position Y2 belonging to the same light emitting element groups 410A1, 410A2, 410A3, . . . are driven to emit lights. A plurality of lights emitted by such a light emitting operation are imaged on the surface 200 of the photosensitive member 2Y by the microlenses ML while being inverted and reduced. In other words, spots are formed at hatched positions of the "second" of FIG. 8. Here, whereas the surface 200 of the photosensitive member 2Y is conveyed in the sub scanning direction YY, the light emitting element rows L411 are successively driven to emit lights from the downstream ones in the sub scanning direction YY (i.e. in the order of the sub scanning direction positions Y1, Y2). This is to deal with the inverting property of the microlenses LS.

Subsequently, the light emitting elements 411 of the light emitting element rows L411 at the sub scanning direction position Y3 belonging to the second most upstream light emitting element groups 410B1, 410B2, 410B3, . . . in the sub scanning direction YY are driven to emit lights. A plurality of lights emitted by such a light emitting operation are imaged on the surface 200 of the photosensitive member 2Y by the microlenses ML while being inverted and reduced. In other words, spots are formed at hatched positions of the "third" of FIG. 8.

Subsequently, the light emitting elements 411 of the light emitting element rows L411 at the sub scanning direction position Y4 belonging to the same light emitting element groups 410B1, 410B2, 410B3, . . . are driven to emit lights. A plurality of lights emitted by such a light emitting operation are imaged on the surface 200 of the photosensitive member 2Y by the microlenses LS while being inverted and reduced. In other words, spots are formed at hatched positions of the "fourth" of FIG. 8.

Subsequently, the light emitting elements 411 of the light emitting element rows L411 at the sub scanning direction position Y5 belonging to the most downstream light emitting element groups 410C1, 410C2, 410C3, . . . in the sub scanning direction YY are driven to emit lights. A plurality of lights emitted by such a light emitting operation are imaged on the surface 200 of the photosensitive member 2Y by the microlenses ML while being inverted and reduced. In other words, spots are formed at hatched positions of the "fifth" of FIG. 8.

Finally, the light emitting elements 411 of the light emitting element rows L411 at the sub scanning direction position Y6 belonging to the same light emitting element groups 410C1, 410C2, 410C3, . . . are driven to emit lights. A plurality of lights emitted by such a light emitting operation are imaged on the surface 200 of the photosensitive member 2Y by the microlenses ML while being inverted and reduced. In other words, spots are formed at hatched positions of the "sixth" of FIG. 8. By performing the first to sixth light emitting operations in this way, a plurality of spots are formed while being aligned on the straight line extending in the main scanning direction XX.

Next, referring back to FIG. 2, the developing device 5Y is described. The developing device 5Y develops an electrostatic latent image formed on the photosensitive member 2Y with a liquid developer 21Y. In FIG. 2, the developing device 5Y includes a developer supplier 16Y, a developing roller 17Y, a compaction roller 18Y, a developing roller cleaner 19Y and a developing roller cleaner collection liquid storage container 20Y.

The developer supplier 16Y includes a developer container 22Y for storing the liquid developer 21Y comprised of toner particles and a nonvolatile liquid carrier, a developer scoop-up roller 23Y, an anilox roller 24Y and a developer restricting blade 25Y.

In the liquid developer 21Y stored in the developer container 22Y, particles having, for example, an average particle diameter of 1 µm and obtained by dispersing a known colorant such as pigment in a likewise known thermoplastic resin used for toner can be used as toner particles. In order to obtain a liquid developer having a low viscosity and a low density, insulating liquid carrier including, for instance, an organic solvent, a silicone oil having an ignition point of 210 degrees centigrade or higher such as phenyl methyl siloxane, dimethyl polysiloxane and polydimethyl cyclosiloxane, and a mineral oil can be used as the liquid carrier. The liquid developer 21Y is obtained by adding the toner particles into the liquid carrier together with a dispersant in such a manner as to have a toner solid concentration of about 20%.

The developer scoop-up roller 23Y is a roller for scooping up the liquid developer 21Y in the developer container 22Y and supplying it to the anilox roller 24Y. The developer scoop-up roller 23Y is rotated clockwise as shown by an arrow in FIG. 2. The anilox roller 24Y is a cylindrical member having fine spiral grooves uniformly formed on the outer surface thereof. The grooves are, for example, dimensioned such that the groove pitch is about 130 µm and the groove depth is about 30 µm. Of course, the dimensions of the grooves are not limited to these values. The anilox roller 24Y is rotated counterclockwise as shown by an arrow in FIG. 2 in the same direction as the developing roller 17Y. The anilox roller 24Y may be rotated clockwise, following the rotation of the developing roller 17Y. In other words, the rotating direction of the anilox roller 24Y can be arbitrarily set without being limited.

The developer restricting blade 25Y is disposed in contact with the outer surface of the anilox roller 24Y. The developer restricting blade 25Y is comprised of a rubber portion made of a urethane rubber or the like and held in contact with the outer surface of the anilox roller 24Y and a plate made of a metal or the like for supporting the rubber portion. The developer restricting blade 25Y removes the liquid developer 21Y adhering to the outer surface of the anilox roller 24Y excluding the grooves by scraping it off with the rubber portion. Accordingly, the anilox roller 24Y supplies only the liquid developer 21Y adhering in the grooves to the developing roller 17Y.

The developing roller 17Y is comprised of a metallic shaft made of an iron for instance, and a cylindrical electrically conductive elastic member having a specified width and including an electrically conductive resin or rubber layer made of an electrically conductive urethane rubber and the like which is mounted on the outer circumferential surface of the metallic shaft. The developing roller 17Y is held in contact with the photosensitive member 2Y and rotated counterclockwise as shown by an arrow in FIG. 2.

The compaction roller 18Y is so arranged as to hold the outer circumferential surface thereof in contact with the outer circumferential surface of the developing roller 17Y. At this time, the compaction roller 18Y and the developing roller 17Y bite each other by a specified amount.

The compaction roller 18Y is rotated clockwise as shown by an arrow in FIG. 2. The compaction roller 18Y has a voltage applied thereto to charge the developing roller 17Y. In this case, a direct-current voltage (DC) is set as the voltage applied to the compaction roller 18Y. A voltage obtained by superposing an alternating-current voltage (AC) on a direct-current voltage (DC) may be set as the voltage applied to the compaction roller 18Y.

By charging the developing roller 17 with the compaction roller 18Y, the compaction roller 18Y applies a contact compaction to the liquid developer 21Y on the developing roller 17Y.

By the contact compaction by the compaction roller 18Y, the liquid developer 21Y on the developing roller 17Y is pressed against the developing roller 17Y.

The compaction roller 18Y includes a compaction roller cleaner blade 26Y and a compaction roller cleaner collection liquid storage container 27Y. The compaction roller cleaner blade 26Y is made of, for example, rubber or the like held in contact with the outer surface of the compaction roller 18Y and removes the liquid developer 21Y residual on the compaction roller 18Y by scraping it off. The compaction roller cleaner collection liquid storage container 27Y includes a container such as a tank for storing the liquid developer 21Y scraped off from the compaction roller 18Y by the compaction roller cleaner blade 26Y.

The developing roller cleaner 19Y is made of, for example, rubber or the like held in contact with the outer surface of the developing roller 17Y and removes the liquid developer 21Y residual on the developing roller 17Y by scraping it off. The developing roller cleaner collection liquid storage container 20Y includes a container such as a tank for storing the liquid developer 21Y scraped off from the developing roller 17Y by the developing roller cleaner 19Y.

The image forming apparatus 1 further includes a developer replenishing device 28Y for replenishing the liquid developer 21Y into the developer container 22Y. The developer replenishing device 28Y includes a toner tank 29Y, a carrier tank 30Y and an agitator 31Y.

A high-concentration liquid toner 32Y is stored in the toner tank 29Y, and a liquid carrier (carrier oil) 33Y is stored in the carrier tank 30Y. A specified amount of the high-concentration liquid toner 32Y from the toner tank 29Y and a specified amount of the liquid carrier 33Y from the carrier tank 30Y are supplied to the agitator 31Y.

The agitator 31Y mixes and agitates the supplied high-concentration liquid toner 32Y and liquid carrier 33Y to produce the liquid developer 21Y to be used in the developing device 5Y. In this case, it is preferable that the viscosity of the entire liquid developer 21Y is 100 mPas to 1000 mPas and that the viscosity of the liquid carrier (carrier oil) alone is 10 mPas to 200 mPas. The viscosity is measured using, for example, a viscoelasticity measuring apparatus ARES (manufactured by T A Instruments, Japan). The liquid developer 21Y produced by the agitator 31Y is supplied to the developer container 22Y.

The photosensitive member squeezer 6Y includes a squeeze roller 34Y, a squeeze roller cleaner 35Y and a squeeze roller cleaner collection liquid storage container 36Y. The squeeze roller 34Y is disposed downstream of a contact portion (nip portion) of the photosensitive member 2Y and the developing roller 17Y in the rotating direction of the photosensitive member 2Y. The squeeze roller 34Y is rotated in a direction (counterclockwise in FIG. 2) opposite to the rotating direction of the photosensitive member 2Y to remove the liquid developer 21Y on the photosensitive member 2Y.

The liquid developer 21Y stored in the compaction roller cleaner collection liquid storage container 27Y, the developing roller cleaner collection liquid storage container 20Y and the squeeze roller cleaner collection liquid storage container 36Y is returned back to the agitator 31Y and re-used.

An elastic roller having an elastic member such as an electrically conductive urethane rubber and a fluororesin surface layer provided on the outer surface of a metallic core is suitably used as the squeeze roller 34Y. The squeeze roller cleaner 35Y is made of an elastic body such as rubber and held in contact with the surface of the squeeze roller 34Y to remove the liquid developer 21Y residual on the squeeze roller 34Y by scraping it off. The squeeze roller cleaner collection liquid storage container 36Y is a container such as a tank for storing the liquid developer 21Y scraped off by the squeeze roller cleaner 35Y.

A voltage of about −200V having a polarity opposite to the charging polarity of the toner particles is applied to the backup roller 37Y to primarily transfer an image formed on the photosensitive member 2Y with the liquid developer 21Y to the intermediate transfer belt 10. Further, the discharger 8Y removes electric charges residual on the photosensitive member 2Y after the primary transfer.

The intermediate transfer belt squeezer 13Y includes an intermediate transfer belt squeeze roller 40Y, an intermediate transfer belt squeeze roller cleaner 41Y and an intermediate transfer belt squeeze roller cleaner collection liquid storage container 42Y. The intermediate transfer belt squeeze roller 40Y collects the liquid developer 21Y on the intermediate transfer belt 10. The intermediate transfer belt squeeze roller cleaner 41Y scrapes off the collected liquid developer 21Y on the intermediate transfer belt squeeze roller 40Y. The intermediate transfer belt squeeze roller cleaner 41Y is made of an elastic material such as rubber similar to the squeeze roller cleaner 35Y. The intermediate transfer belt squeeze roller cleaner collection liquid storage container 42Y collects and stores the liquid developer 21Y scrapped off by the intermediate transfer belt squeeze roller cleaner 41Y.

When an image forming operation is started, the photosensitive member 2Y is uniformly charged by the charging member 3Y. Subsequently, an electrostatic latent image is formed on the photosensitive member 2Y by the line head 4Y. Subsequently, in the developing device 5Y, the liquid developer 21Y of yellow (Y) is scooped up to the anilox roller 24Y by the developer scoop-up roller 23Y. A proper amount of the liquid developer 21Y adhering to the anilox roller 24Y is caused to adhere in the grooves of the anilox roller 24Y by the developer restricting blade 25Y. The liquid developer 21Y in the grooves of the anilox roller 24Y is supplied to the developing roller 17Y.

At this time, a part of the liquid developer 21Y in the grooves of the anilox roller 24Y moves toward the opposite left and right ends of the anilox roller 24Y. Further, the yellow (Y) toner particles of the liquid developer 21Y on the developing roller 17Y are pressed against the developing roller 17Y by the contact compaction by the compaction roller 18Y. The liquid developer 21Y on the developing roller 17Y is conveyed toward the photosensitive member 2Y by the rotation of the developing roller 17Y while being compacted.

After completing the contact compaction by the compaction roller 18Y, the liquid developer 21Y residual on the compaction roller 18Y is removed from the compaction roller 18Y by the compaction roller cleaner blade 26Y.

The electrostatic latent image formed on the photosensitive member 2Y of yellow (Y) is developed with the liquid developer 21Y of yellow (Y) in the developing device 5Y, whereby an image is formed on the photosensitive member 2Y with the liquid developer 21Y of yellow (Y). After completing the image development, the liquid developer 21Y residual on the developing roller 17Y is removed from the developing roller 17Y by the developing roller cleaner 19Y. The image formed with the liquid developer 21Y of yellow (Y) on the photosensitive member 2Y is formed into a yellow (Y) toner image by collecting the liquid developer 21Y on the photosensitive member 2Y by means of the squeeze roller 34Y. Further, this yellow (Y) toner image is transferred to the intermediate transfer belt 10 by the primary transfer device 7Y. The yellow (Y) toner image on the intermediate transfer belt 10 is conveyed toward the primary transfer device 7M of magenta (M) shown in FIG. 1 while the liquid developer 21Y on the intermediate transfer belt 10 is collected by the intermediate transfer belt squeeze roller 40Y.

In FIG. 1, an electrostatic latent image formed on the photosensitive member 2M of magenta (M) is subsequently developed with a magenta (M) liquid developer conveyed as in the case of yellow (Y) in the developing device 5M, whereby an image is formed with the magenta (M) liquid developer on the photosensitive member 2M. At this time, the carrier residual on a compaction roller 18M after the completion of the contact compaction by the compaction roller 18M is removed from the compaction roller 18M by a compaction roller cleaner blade 26M. Further, the liquid developer residual on the developing roller 17M after the completion of the image development is removed from the developing roller 17M by a developing roller cleaner 19M.

The image formed with the liquid developer of magenta (M) on the photosensitive member 2M is formed into a magenta (M) toner image by the liquid developer on the photosensitive member 2M being collected by means of the squeeze roller 34M. This magenta (M) toner image is transferred to the intermediate transfer belt 10 in the primary transfer device 7M while being superimposed on the yellow (Y) toner image. Similarly, the superimposed yellow (Y) and magenta (M) toner images are conveyed toward the primary transfer device 7C of cyan (C) while the liquid developer on the intermediate transfer belt 10 is collected by the intermediate transfer belt squeeze roller 40M. Hereinafter, a cyan (C) toner image and a black (K) toner image are successively similarly transferred in a superimposed manner to the intermediate transfer belt 10, whereby a full color toner image is formed on the intermediate transfer belt 10.

Subsequently, the color toner image on the intermediate transfer belt 10 is secondarily transferred to a transfer surface of a transfer material such as a sheet by the secondary transfer device 14. The color toner image transferred to the transfer material is fixed as before by an unillustrated fixing device, and the transfer material having the full color fixed image formed thereon is conveyed to a discharge tray, whereby the color image forming operation is completed.

The embodiment above brings about the following effects.

(1) Since the microlens array 430 is formed by the divided lens substrates 434, 435, 437 and 438, the lens substrates 434, 435, 437 and 438 may be formed small. This permits size reduction of the mold which is used to form the lenses 432, 433, and hence, it is possible to obtain the microlens array 430 in which manufacturing cost is reduced, and the accuracy of relative position of the lenses 432 and 433 is improved. Further, the line heads 4Y, 4M, 4C and 4K and the image forming apparatus 1 which utilize this as well achieve similar effects. In addition, the gaps 439 between the mutually adjacent lens substrates 434, 435, 437, 438 absorb distortion which is attributable to the coefficients of thermal expansion of the lens substrates 434, 435, 437 and 438, thereby realizing the microlens array 430 in which the accuracy of relative position of the lenses 432 to that of the lenses 433 is maintained even despite a temperature change if any.

(2) Since the plurality of lens substrates 434, 435, 437 and 438 on the both surfaces of the glass substrate 431 can be arranged using the glass substrate 431 as a reference, the accuracy of the positions of the lens substrates 434, 435, 437 and 438 relative to each other can be improved. Hence, it is possible to obtain the microlens array 430 in which the accuracy of relative position of the lenses 432 to that of the lenses 433 is improved.

Second Embodiment

FIG. 9 is a partial cross sectional view in the vicinity of a microlens array 4301 and the light shielding member 440 according to a second embodiment. The structure is similar to that according to the first embodiment except for the microlens array 4301. The same parts and members as those of the first embodiment are denoted at the same reference symbols.

In FIG. 9, the lenses 432 are provided in one surfaces of the lens substrates 434 and 437. In this embodiment, the lens substrates 434, 437, . . . and the lenses 432 constitute the microlens array 4301. The gaps 439 are provided between the lens substrate 434 and the lens substrate 437 as in the first embodiment and filled with the light absorbing material 4390. The microlens array 4301 is adhered directly to the light shielding member 440 by the adhesive 436.

In addition to the effects according to the earlier embodiment, this embodiment achieves the following effect.

(3) Since the light shielding member 440 and the microlens array 4301 are integrated as one, it is possible to assemble the line heads 4Y, 4M, 4C and 4K easily and to obtain the line heads 4Y, 4M, 4C and 4K at a reduced manufacturing cost. Further, the line heads 4Y, 4M, 4C and 4K and the image forming apparatus 1 which utilize this as well attain a similar effect.

Third Embodiment

Figure 10:
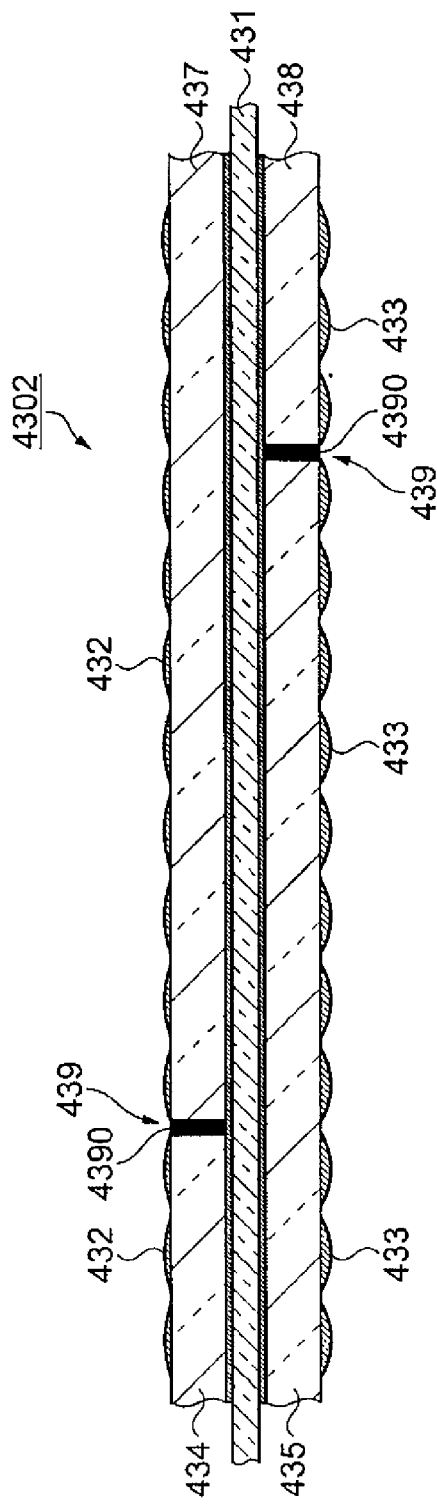
FIG. 10 is a partial cross sectional view of a microlens array according to a third embodiment.

FIG. 10 is a partial cross sectional view of a microlens array 4302 according to a third embodiment. The structure is similar to that according to the first embodiment except for the microlens array 4302. The same reference symbols denote the same components and materials as those used in the first embodiment.

In FIG. 10, the lens substrates 434, 435, 437 and 438 are arranged on the both surfaces of the glass substrate 431, and the positions of the gaps 439 relative to the surfaces of the glass substrate 431 are shifted between the both surfaces.

In addition to the effects according to the earlier embodiment, this embodiment achieves the following effect.

(4) The influence on the accuracy of position exerted by the gaps 439 is dispersed because of the shifting of the gaps 439 between the both surfaces of the glass substrate 431. Accordingly, it is possible to obtain the microlens array 4302 in which the accuracy of relative position of the lenses 432 and 433 is even better The line heads 4Y, 4M, 4C and 4K and the image forming apparatus 1 which utilize this as well attain a similar effect. That is, in this embodiment, the plurality of lens substrates 437 in the main scanning direction XX (first direction) are arranged side by side with the gaps 439 from each other in the main scanning direction XX. Further, the plurality of gaps 439 created on the both surfaces of the glass substrate 431 (clear substrate) are shifted from each other in the main scanning direction XX. Hence, the shifting of the gaps 439 between the both surfaces of the glass substrate 431 disperses the influence on the accuracy of position exerted by the gaps 439. It is therefore possible to obtain the microlens array 4302 in which the accuracy of relative position of the lenses 432 and 433 is even better.

Fourth Embodiment

Figure 11:
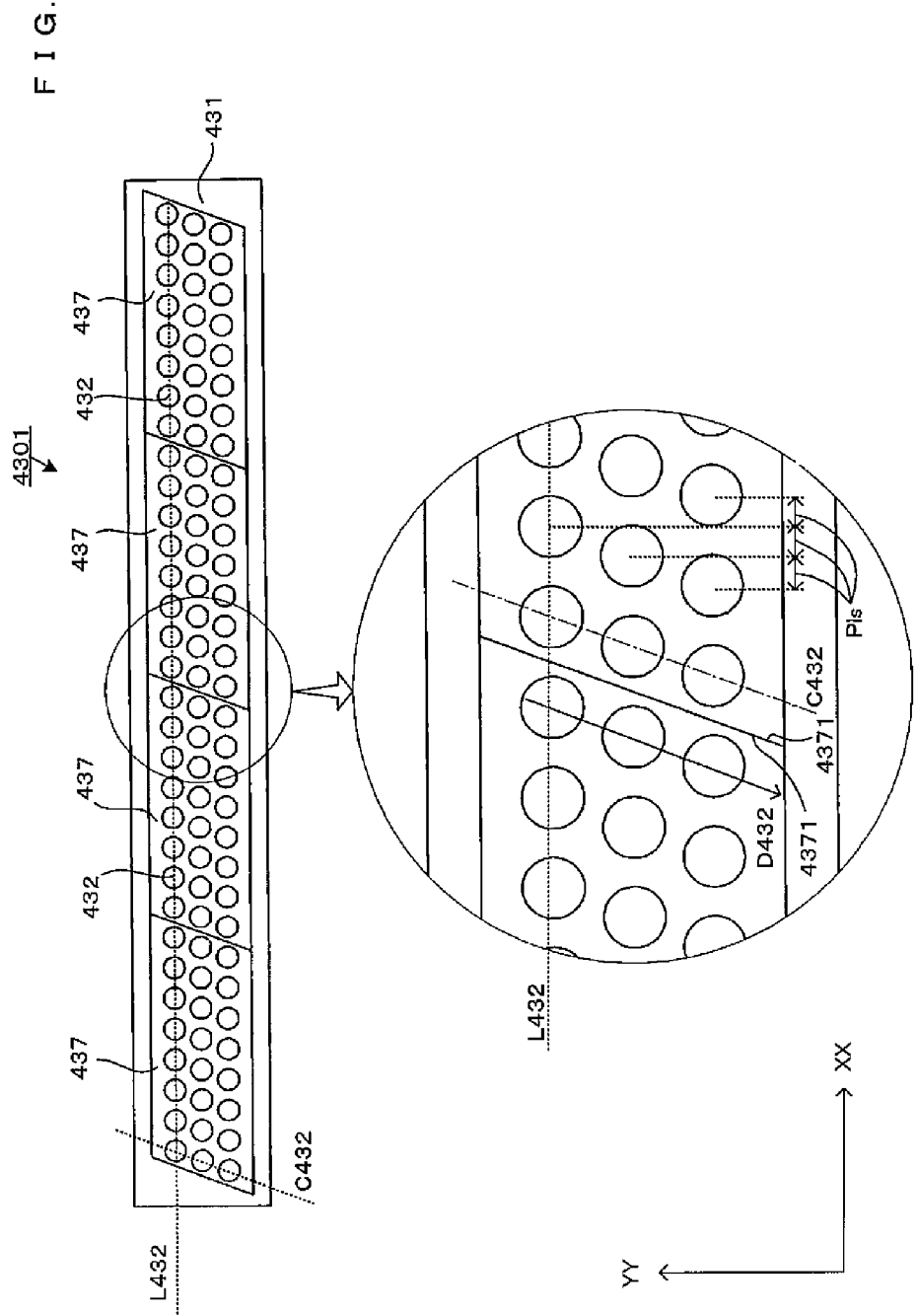
FIG. 11 is a plan view of a microlens array according to a fourth embodiment.
Figure 12:
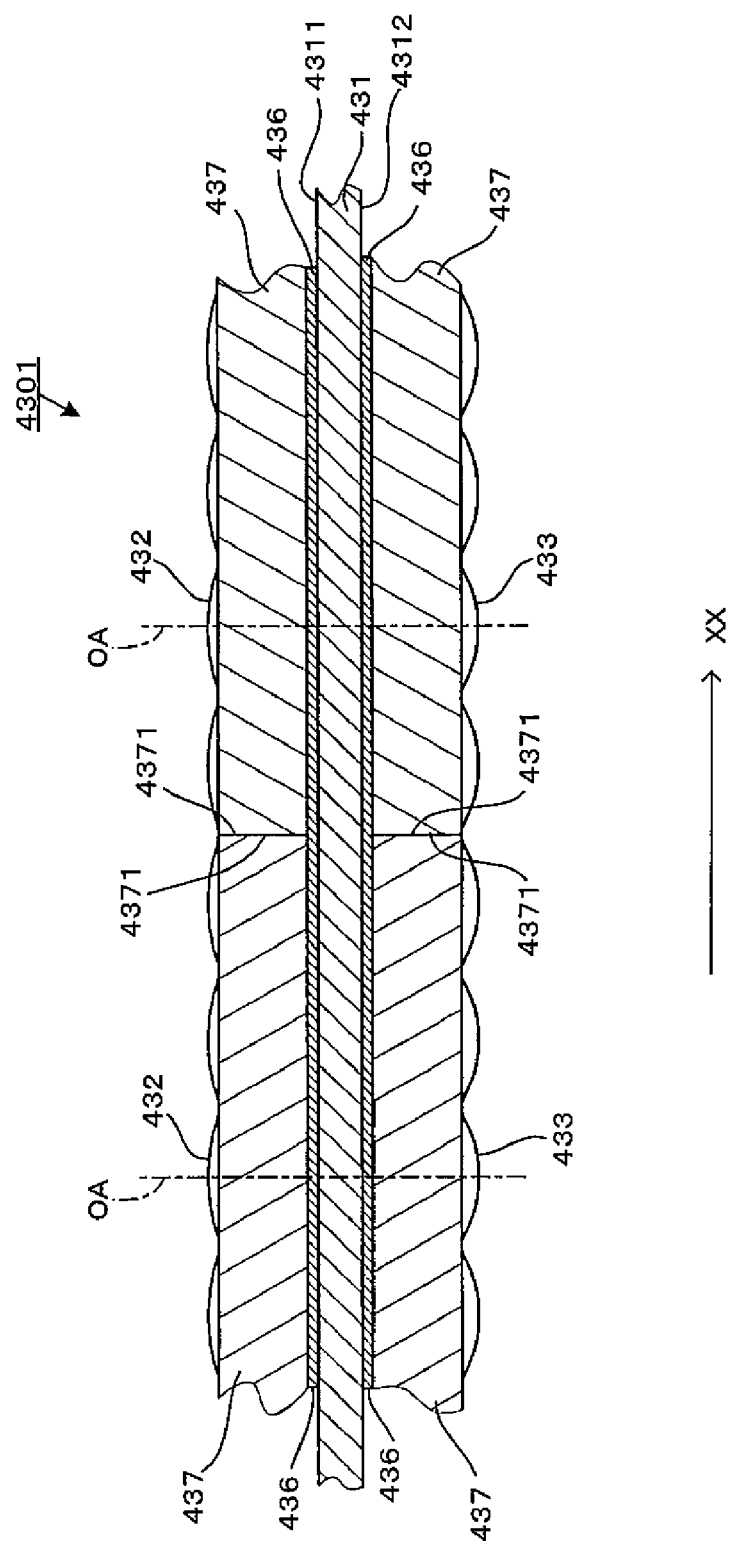
FIG. 12 is a partial cross sectional view of the microlens array of FIG. 11 taken along the main scanning direction.

FIG. 11 is a plan view of a microlens array according to a fourth embodiment. FIG. 12 is a partial cross sectional view of the microlens array of FIG. 11 taken along the main scanning direction. As shown in FIGS. 11 and 12, the microlens array 4301 comprises the glass substrate 431 (support member, clear substrate). A plurality (four in this embodiment) of lens substrates 437 are arranged on each one of the both surfaces 4311 and 4312 of the glass substrate 431. The lens substrates 437 have approximately the same shapes and are each shaped approximately as a parallelogram. In more detail, each lens substrate 437 has the following structure.

The lens substrate 437 comprises a plurality of lenses 432 and 433. As shown in FIG. 11, three lenses 432 are arrayed at mutually different positions in the sub scanning direction YY to constitute a lens column C432 in the lens substrate 437. Three lenses 432 constituting the lens column C432 are shifted by lens pitches Pls in the main scanning direction XX. Accordingly, an arranging direction D432 of the lenses 432 in the lens column C432 is a direction different from the main scanning direction XX (first direction) and oblique with respect to the sub scanning direction YY (second direction).

In the lens substrate 437, the plurality of lens columns C432 are arranged in the main scanning direction XX. Further, edges 4371 of the lens substrate 437 in the main scanning direction XX are parallel (or approximately parallel) to the arranging direction D432. A method of finishing the shapes of the edges 4371 in this way includes for instance a method of cutting, in the arranging direction D432, the edges in the main scanning direction XX of the lens substrate 437.

In this embodiment, the lens substrates 437 structured in this way are mounted to each of the surfaces 4311, 4312 of the glass substrate. Meanwhile, those lenses provided on the top surface of the glass substrate 431 are denoted at 432 and those lenses provided on the back surface are denoted at 433. As shown in FIG. 12, the lenses 432 and 433 are provided in a one-to-one correspondence with each other, and one lens 432 and the corresponding lens 433 share the optical axis OA. The lens substrates 437 are adhered by the adhesive 436 to the surfaces 4311, 4312 of the glass substrate.

Four lens substrates 437 are provided in each one of the surfaces 4311, 4312 of the glass substrate. Taking the glass substrate surface 4311 as a representative example, the four lens substrates 437 are arranged side by side in the main scanning direction XX. The two lens substrates 437 adjacent to each other in the main scanning direction XX are provided such that their edges 4371 are parallel or approximately parallel to each other. Further, these two adjacent lens substrates 437 are side by side in the main scanning direction XX while abutting on each other, and their edges 4371 are on each other.

With the lens substrates 437 attached to the glass substrate 431 in this fashion, the microlens array 4301 is obtained as described below in which the plurality of lenses 432 are in a two-dimensional arrangement. That is, in this microlens array 4301, the lens rows L432 are formed by the plurality of lenses 432 which are arranged in the main scanning direction XX and the three lens rows L432 are disposed at mutually different positions in the sub scanning direction YY. The respective lens rows L432 are shifted by lens pitches Pls in the main scanning direction XX, whereby a plurality of lens columns C432 tilted toward the sub scanning direction YY are arranged in the main scanning direction XX.

As described above, in this embodiment, the microlens array 4301 comprises the glass substrate 431 (support member) and the plurality of lens substrates 437 supported by the glass substrate 431. In addition, the plurality of lenses 432 are arranged in the main scanning direction XX on each lens substrate 437. And the glass substrate 431 supports the plurality of lens substrates 437 arranged in the main scanning direction XX. In other words, the microlens array 4301 is formed by the plurality of lens substrates 437 in this embodiment. The lens substrates 437 can therefore be small. As a result, it is possible to manufacture the lens substrates 437 using a relatively small lens substrate forming mold. In short, it is possible to manufacture the lens substrates 437 using a mold which has a relatively high accuracy. Hence, it is possible to obtain the microlens array 4301 in which the accuracy of relative position of the lenses 432 is improved and to reduce the manufacturing cost.

Further, in this embodiment, the plurality of lens substrates 437 are arranged side by side in the main scanning direction XX on at least one surface (on the both surfaces in the fourth embodiment) of the glass substrate 431 (clear substrate) which functions as a support member to constitute the microlens array 4301. Hence, it is possible to obtain in a simple manner the microlens array 4301 which is long in the main scanning direction XX.

Further, using the glass substrate 431 as the clear substrate, this embodiment is preferable. That is, since the coefficient of linear expansion of the glass substrate 431 is relatively small, a change of the clear substrate by the temperature can be suppressed.

Further, in this embodiment, the edges 4371 of the lens substrates 437 in the main scanning direction XX are parallel or approximately parallel to the arranging direction D432. Accordingly, by arranging the plurality of lens substrates 437 side by side in the main scanning direction XX, it is possible to obtain the microlens array 4301 in which the plurality of lenses 432 are arranged in a two-dimensional arrangement in a simple fashion.

Further, in a structure in which the plurality of lens substrates 437 are side by side in the main scanning direction XX while abutting on each other as in this embodiment, it is preferable that the coefficients of linear expansion of the lens substrates 437 and the glass substrate (support member) 431 are the same or approximately the same. Such a structure realizes the microlens array 4301 in which distortion attributable to a temperature change is discouraged.

Fifth Embodiment

By the way, as shown in FIG. 6, the line heads 4Y . . . according to the first embodiment are structured such that the glass substrate 431 (the base substrate) which serves as the support member supports the lens substrates 437. In the meantime, the line heads 4Y . . . according to the third embodiment have the following structure as shown in FIG. 9. That is, there are the head substrate 450 which includes the light emitting element groups 410 which are groups of the plurality of light emitting elements 411, the microlens array 4301 in which the lenses 432 are arranged for each light emitting element group 410, and the light shielding member 440 which is disposed between the microlens array 4301 and the head substrate 450 and includes the light guiding holes 4410 extending from the light emitting element groups 410 toward the lenses 432. The microlens array 4301 includes the plurality of lens substrates 437 which are arranged in the main scanning direction XX. Further, the light shielding member 440 supports the plurality of lens substrates 437 which are arranged in the main scanning direction XX. In other words, the light shielding member 440 functions as a support member in the third embodiment. However, the structure for supporting the plurality of lens substrates 437 is not limited to this but may be as described below.

Figure 13:
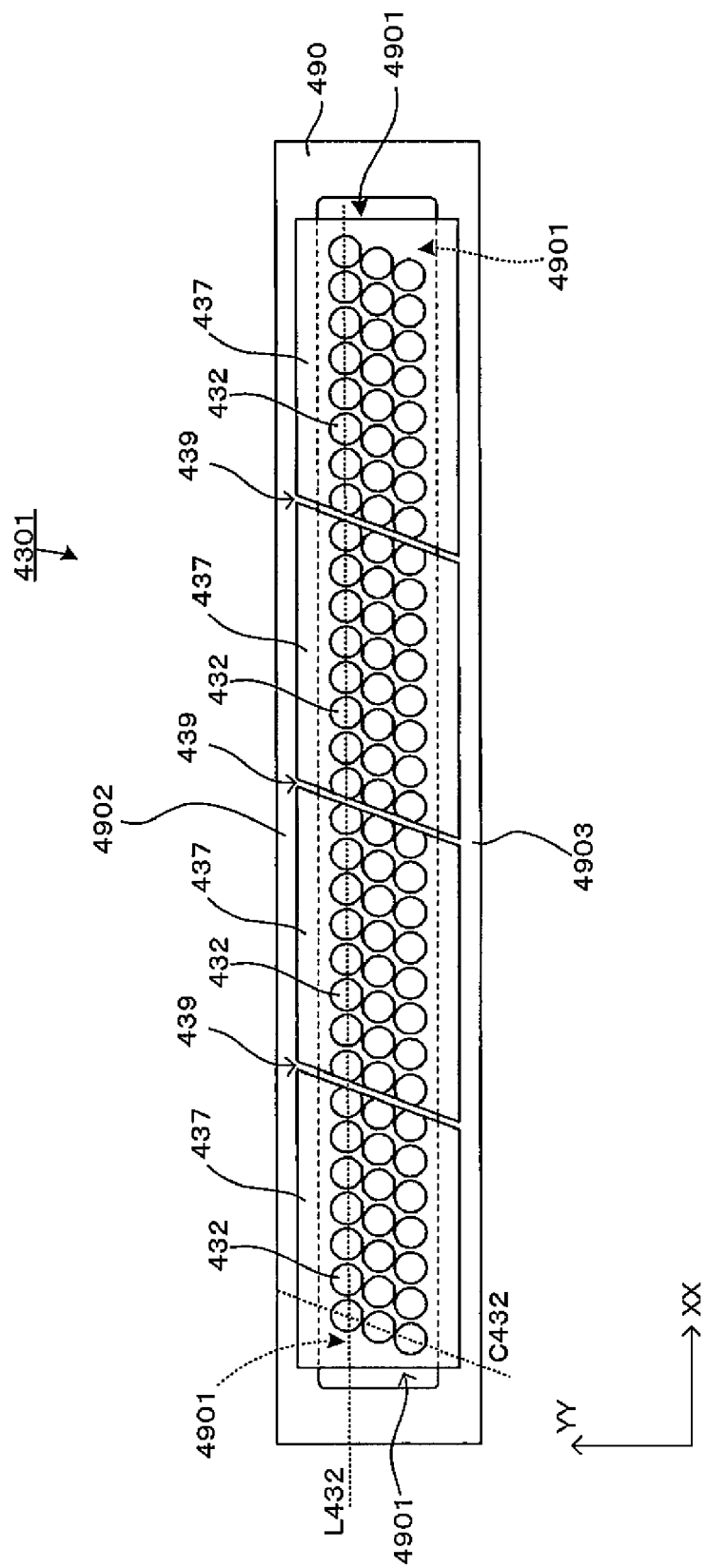
FIG. 13 is a plan view of a microlens array according to a fifth embodiment.

FIG. 13 is a plan view of a microlens array according to a fifth embodiment. In this embodiment, an outer frame 490 corresponds to a "support member" of the invention. The outer frame 490 is shaped approximately as a rectangle which is long in the main scanning direction XX. A through hole 4901 is formed penetrating through the outer frame 490 in a perpendicular direction to the plane of FIG. 13. As shown in FIG. 13, the through hole 4901 as well is shaped approximately as a rectangle which is long in the main scanning direction XX. Structured as such, the outer frame 490 has two beams 4902, 4903 which elongate in the main scanning direction XX so that the beams are spaced apart from each other in the sub scanning direction YY The plurality of lens substrates 437 are arranged side by side in the main scanning direction XX with the gaps 439 between each other on one surface of the outer frame 490. The lens substrates 437 are across the beams 4902, 4903. The plurality of lenses 432 formed in the lens substrates 437 are opposed to the through hole 4901. Accordingly, light beams from the light emitting element groups 410 impinge upon the lenses 432 after passing through the through hole 4901 for instance.

As described above, in the fifth embodiment as well, the microlens array 4301 is formed by the plurality of lens substrates 437. Hence, the lens substrates 437 can be small. As a result, it is possible to manufacture the lens substrates 437 using a relatively small lens substrate forming mold. In short, since it is possible to manufacture the lens substrates 437 using a mold which has a relatively high accuracy, it is possible to obtain the microlens array 4301 in which the accuracy of relative position of the lenses 432 is improved and to reduce the manufacturing cost.

Further, the plurality of lens substrates 437 arranged in the main scanning direction XX are side by side with the gaps 439 from each other in the main scanning direction XX in the fifth embodiment. The gaps 439 can therefore absorb distortion due to a temperature change which is attributed to a difference between the coefficient of thermal expansion of the lens substrates 437 and that of the outer frame 490, which in turn makes it possible to obtain the microlens array 4301 in which the accuracy of relative position of the lenses 432 is improved regardless of a temperature change.

Sixth Embodiment

Figure 14:
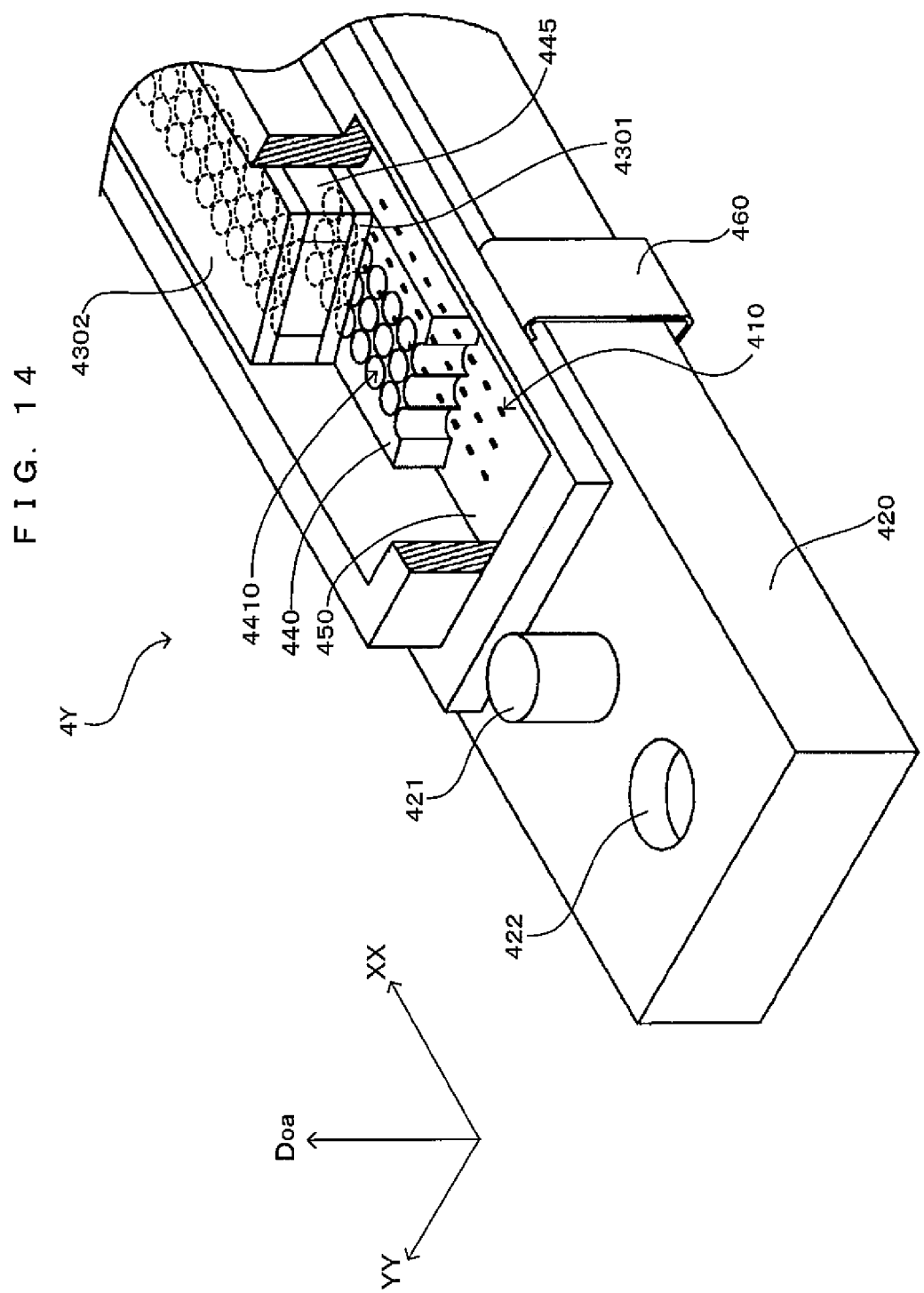
FIG. 14 is a perspective view schematically showing a line head in a sixth embodiment.
Figure 15:
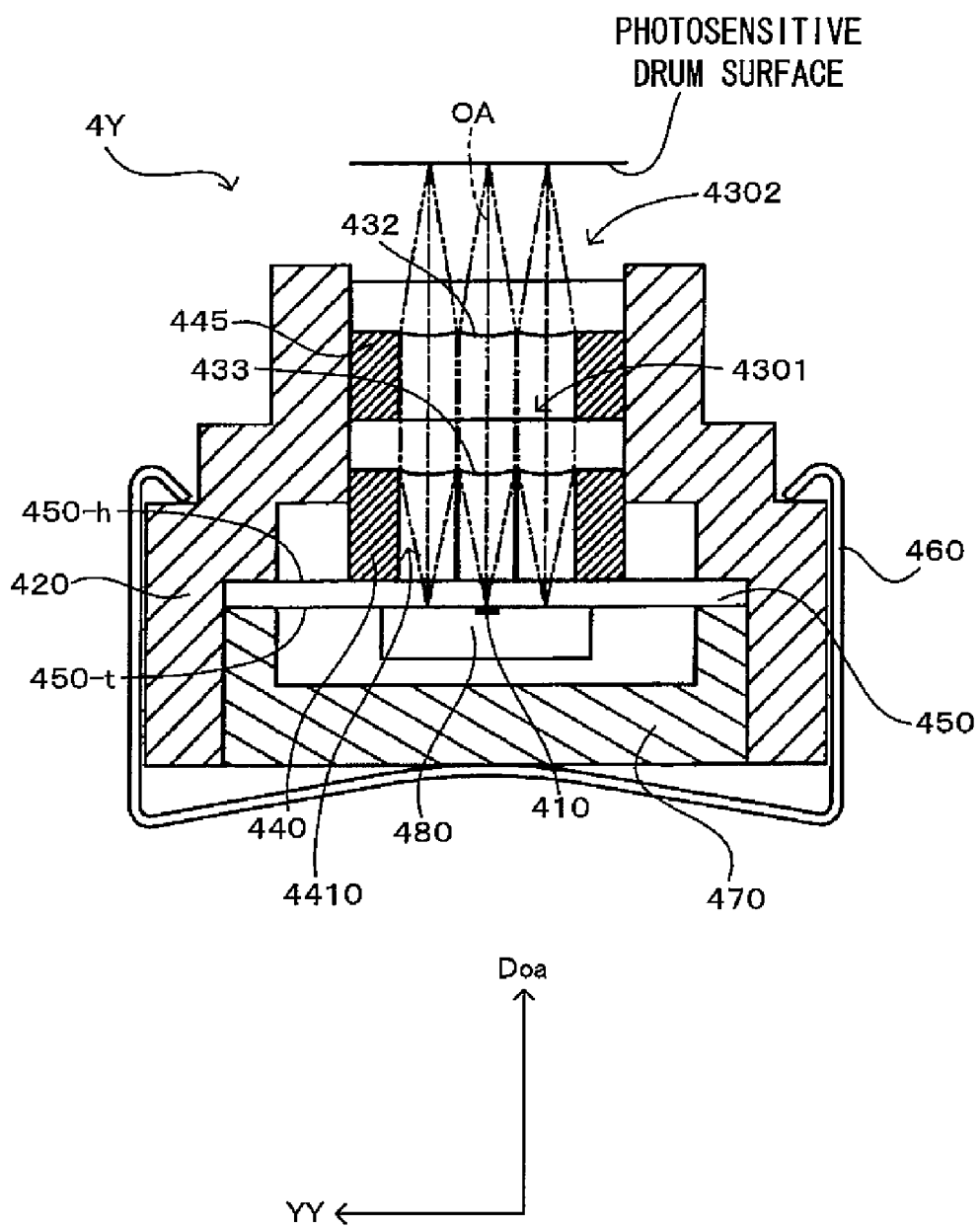
FIG. 15 is a partial cross sectional view of the line head shown in FIG. 14 taken along the width direction and parallel to the optical axes of the lenses.

FIG. 14 is a perspective view schematically showing a line head in a sixth embodiment. FIG. 15 is a partial cross sectional view of the line head shown in FIG. 14 taken along the width direction and parallel to the optical axes of the lenses. A difference of the sixth embodiment from the embodiments already described relates to the number of microlens arrays. In other words, the line head 4Y and the like in the sixth embodiment comprise two microlens arrays 4301 and 4302. Similar to the embodiments described above, a plurality of light emitting elements are formed in a head substrate 450 in the line head 4Y and the like and each light emitting element emits a light beam toward the surface of the photosensitive drum. Consequently, in this specification, a direction which is orthogonal to the main scanning direction XX and the sub scanning direction YY and which is toward the surface of the photosensitive drum from the light emitting elements is a propagation direction Doa of the light beams. The propagation direction Doa of the light beams is parallel to or approximately parallel to the optical axes OA. In relation to the sixth embodiment, differences from the embodiments described above will mainly be described but common structures will simply be denoted at corresponding reference symbols to avoid redundant description.

Inside the case 420 of the line head 4Y, the head substrate 450, the light shielding member 440 and the two microlens arrays 4301 and 4302 are provided. An inner portion of the case 420 abuts on the front surface 450-*h* of the head substrate 450, while the underside lid 470 abuts on the back surface 450-*t* of the head substrate 450. The light emitting element groups 410 which are groups of the plurality of light emitting elements are provided on the back surface 450-*t* of the head substrate 450. When the light emitting element groups 410 emit light beams toward the propagation direction Doa of the light beam, the light beams propagate toward the surface of the photosensitive drum after transmitting through the head substrate 450.

Further, the light shielding member 440 is adhered to and arranged on the front surface 450-*h* of the head substrate 450. In the light shielding member 440, a light guiding hole 4410 is formed for each one of the plurality of light emitting element groups 410. In other words, the plurality of light guiding holes 4410 are provided for the plurality of light emitting element groups 295 on a one-to-one correspondence. Each light guiding hole 4410 is bored in the light shielding member 440 as a hole which penetrates the light shielding member 440 in the propagation direction Doa of the light beam.

The two microlens arrays 4301 and 4302 are arranged side by side in the propagation direction Doa of the light beam on the upper side (namely, the opposite side to the head substrate 450) of the light shielding member 440. These two microlens arrays 4301 and 4302 are opposed to each other across a pedestal 445, and the pedestal 445 functions to define a gap between the microlens arrays 4301 and 4302. Since the two microlens arrays 4301 and 4302 are thus provided in this embodiment, the two lenses 433 and 432 which are arranged side by side in the propagation direction Doa of the light beam are opposed to each other in each light emitting element group 410. Here, the lenses 433 are the lenses which the microlens array 4301 comprises, while the lenses 432 are the lenses which the microlens array 4302 comprises. The optical axis OA which is on the center of each one of the two lenses 433 and 432 for the same light emitting element group 410 is orthogonal to or approximately orthogonal to the back surface 450-*t* of the head substrate 450. The two lenses 433 and 432 thus form one imaging optical system, and light beams emitted from the light emitting element group 410 are imaged by the imaging optical system which is opposed to the light emitting element group. Thus, in this embodiment, since the plurality of microlens arrays 4301 and 4302 are arranged side by side in the propagation direction Doa of the light beam, it is possible to improve the freedom of optical design.

Figure 16:
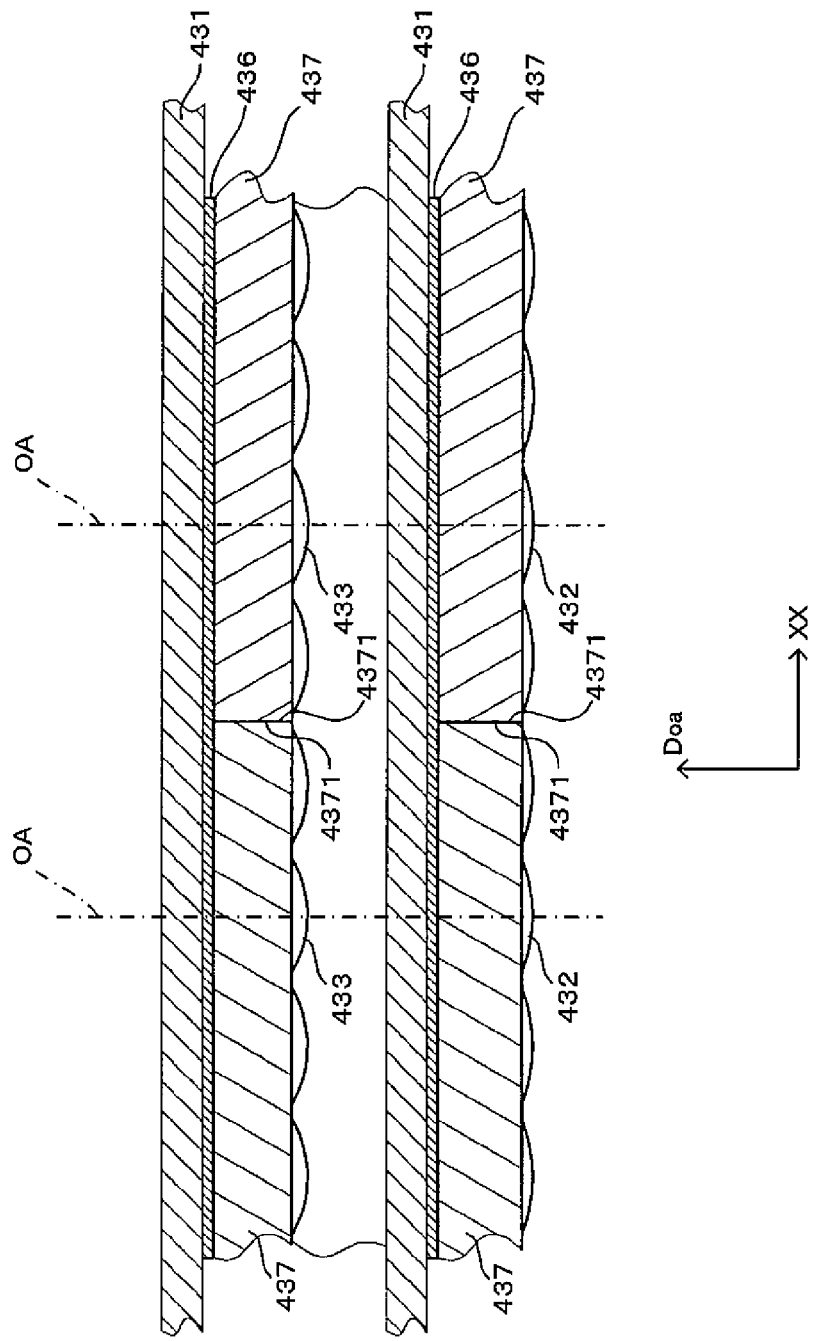
FIG. 16 is a partial cross sectional view which shows the structure of the two microlens arrays in the sixth embodiment.

FIG. 16 is a partial cross sectional view which shows the structure of the two microlens arrays in the sixth embodiment. As shown in FIG. 16, each one of the microlens arrays 4301 and 4302 is formed by adhering the lens substrates 437 to the back surface of the glass substrate 431. Here, the back surface of the glass substrate 431 is one of the substrate surfaces of the glass substrate 431 which is on the upstream side in the propagation direction Doa of the light beam. In short, the plurality of lens substrates 437 are arranged side by side in the main scanning direction XX in contact with each other on the back surface of the glass substrate 431. Further, the lens substrates 437 are adhered to the glass substrate 431 by the adhesive 436.

Thus, in the sixth embodiment as well, the microlens array 4301 is obtained as the plurality of lens substrates 437 are arranged side by side. It is therefore possible to realize the microlens array 4301 in which the accuracy of relative position of the lenses is improved and to reduce the manufacturing cost.

Seventh Embodiment

By the way, in any one of the embodiments above, the description is made in the case where the invention is applied to a microlens array in which the arranging direction D432 of the lenses 432 in the lens columns C432 is tilted with respect to the sub scanning direction YY. However, the structure of a microlens array to which the invention is applicable is not limited to this, and the invention is applicable also to a microlens array as that described below. A difference of the seventh embodiment from the preceding embodiments described above will now be principally described, but common structures will simply be denoted at corresponding reference symbols to avoid redundant description.

Figure 17:
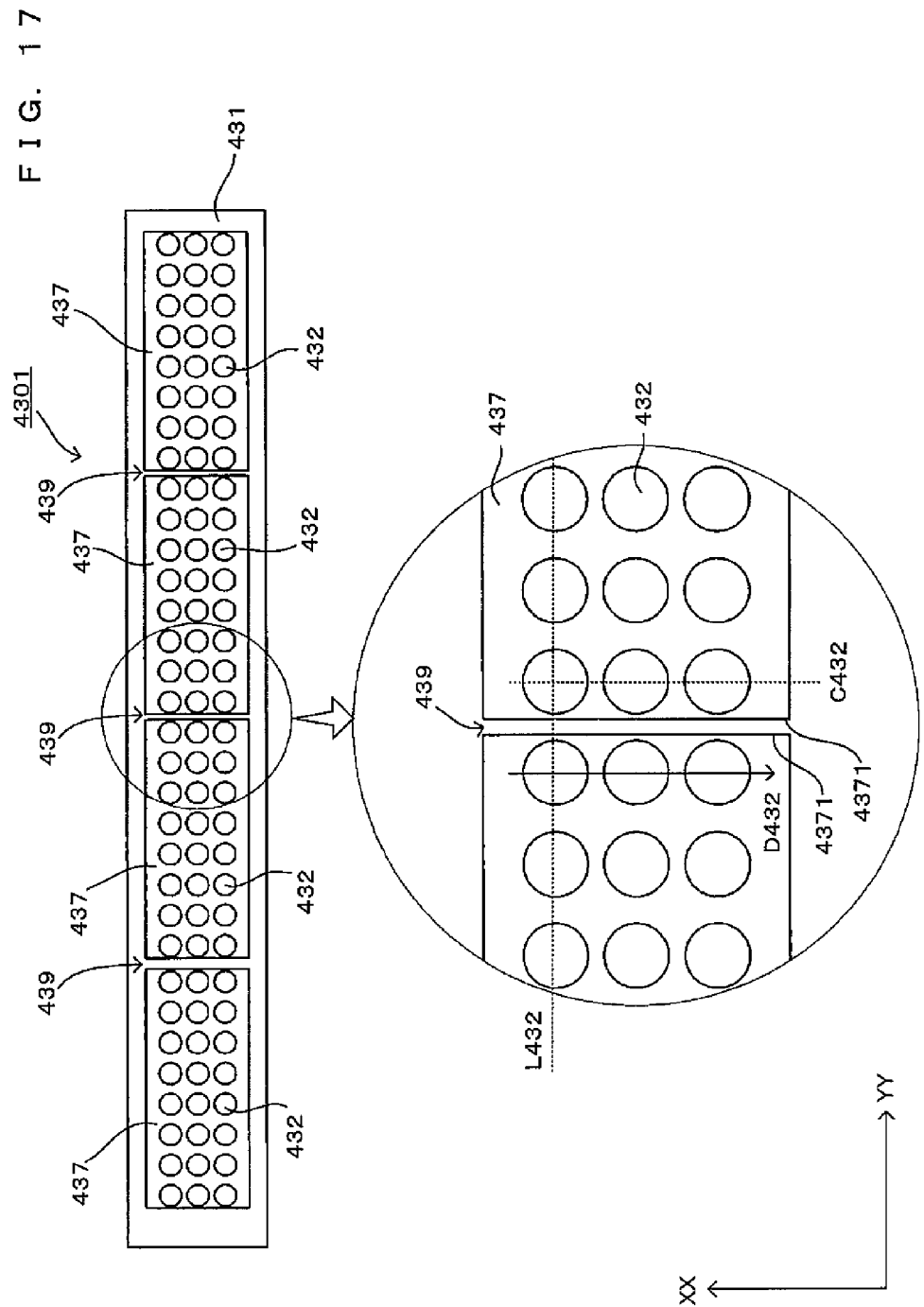
FIG. 17 is a plan view of a microlens array according to an seventh embodiment.

FIG. 17 is a plan view of a microlens array according to an seventh embodiment. The difference of the eighth embodiment from the preceding embodiments described above lies in the arranging direction D432 of the lenses 432 in the lens columns C432. In short, the arranging direction D432 of the lenses is oblique with respect to the sub scanning direction YY in the earlier embodiments. On the contrary, in the seventh embodiment, the arranging direction D432 of the lenses is parallel to or approximately parallel to the sub scanning direction YY. That is, as shown in FIG. 17, three lenses 432 are arrayed in the sub scanning direction YY to constitute a lens column C432 in the lens substrates 437, and a plurality of lens columns C432 are arranged side by side in the main scanning direction XX. The edges 4371 of the lens substrates 437 in the main scanning direction are parallel (or approximately parallel) to the arranging direction D432.

In this embodiment as well, four lens substrates 437 are provided on the substrate surface of the glass substrate 431. The four lens substrates 437 are arranged side by side in the main scanning direction XX with the gaps 439 therebetween. The two lens substrates 437 adjacent to each other with the gap 439 in the middle are provided such that their edges 4371 are parallel to each other. The edges 4371 facing the gaps 439 are finished so as to be parallel to the arranging direction D432. Hence, the gap 439 formed between the two edges 4371 having such a shape is parallel to the arranging direction D432. In addition, since the arranging direction D432 is parallel to the sub scanning direction YY, the gap 439 is parallel to the sub scanning direction YY Thus, in the seventh embodiment as well, the microlens array 4301 is obtained as the plurality of lens substrates 437 are arranged side by side. It is therefore possible to realize the microlens array 4301 in which the accuracy of relative position of the lenses is improved and to reduce the manufacturing cost.

Others

Thus, in the embodiments above, the main scanning direction XX corresponds to a "first direction" of the invention and the sub scanning direction YY corresponds to a "second direction" of the invention. In the first, the third, the fourth, the sixth and the seventh embodiments, the glass substrate 431 functions as a "support member (base substrate)" of the invention. Meanwhile, in the fifth embodiment, the outer frame 490 functions as a "support member (base substrate)" of the invention. Further, in the second embodiment, the light shielding member 440 functions as a "support member (base substrate)" of the invention.

As described above, a lens array of an embodiment comprises a plurality of lens substrates which include a plurality of lenses arranged in a first direction; and a support member which supports the plurality of lens substrates arranged in the first direction.

Further, a line head of a first aspect of an embodiment comprises: a head substrate which includes a plurality of light emitting element groups each of which is a group of a plurality of light emitting elements; and a lens array which includes a plurality of lens substrates which include a plurality of lenses arranged in a first direction and for each light emitting element group, and a support member which supports the plurality of lens substrates arranged in the first direction.

Further, a line head of a second aspect of an embodiment comprises: a head substrate which includes a plurality of light emitting element groups each of which is a group of a plurality of light emitting elements; a lens array which includes a plurality of lens substrates arranged in a first direction which include a plurality of lenses arranged in the first direction and for each light emitting element group; and a shielding member which is disposed between the lens array and the head substrate, includes light guiding holes which extend from the light emitting element groups toward the lenses, and supports the plurality of lens substrates arranged in the first direction.

Further, an image forming apparatus of a first aspect of an embodiment comprises: a latent image carrier; a head substrate which includes a plurality of light emitting element groups each of which is a group of a plurality of light emitting elements; and a lens array which includes a plurality of lens substrates which include a plurality of lenses arranged in a first direction and for each light emitting element group, and a support member which supports the plurality of lens substrates arranged in the first direction, the lenses focusing light from the light emitting elements to form spots on a surface of the latent image carrier.

Further, an image forming apparatus of a second aspect of an embodiment comprises: a latent image carrier; a head substrate which includes a plurality of light emitting element groups each of which is a group of a plurality of light emitting elements; a lens array which includes a plurality of lens substrates arranged in a first direction which include a plurality of lenses arranged in the first direction and for each light emitting element group; and a shielding member which is disposed between the lens array and the head substrate, includes light guiding holes which extend from the light emitting element groups toward the lenses, and supports the plurality of lens substrates arranged in the first direction, the lenses focusing light from the light emitting elements to form spots on a surface of the latent image carrier.

According to the embodiment (the lens array, the line head and the image forming apparatus) structured in this way, the lens array is constituted by the plurality of lens substrates. Hence, each lens substrate can be small. It is therefore possible to manufacture the lens substrates using a relatively small lens substrate forming mold. In other words, since it is possible to manufacture the lens substrates using a mold which has a relatively high accuracy, it is possible to obtain a lens array in which the accuracy of relative position of the lenses is improved and to reduce the manufacturing cost.

The support member may be a clear substrate, and the plurality of lens substrates may be arranged side by side in the first direction on at least one surface of the clear substrate. At this time, the plurality of lens substrates may be arranged side by side on each one of the both surfaces of the clear substrate. Such a structure makes it possible to obtain a lens array which is long in the first direction in a simple manner.

The clear substrate may be a glass substrate. Since the coefficient of linear expansion of glass is relatively small, this structure suppresses a change by temperature of the clear substrate.

In the lens substrates, it may be structured that a plurality of lenses are arrayed in an arranging direction different from the first direction to constitute a lens column and a plurality of the lens columns are arranged side by side in the first direction. Such a structure makes it possible to arrange the plurality of lenses two-dimensionally in the lens array.

At this time, the arranging direction may be tilted to a second direction which is orthogonal to the first direction. Alternatively, the arranging direction may be parallel or approximately parallel to a second direction which is orthogonal to the first direction.

Further, it may be structured that an edge of the lens substrates in the first direction is parallel or approximately parallel to the arranging direction. Such a structure makes it possible to obtain a lens array in a simple way in which the plurality of lenses are two-dimensionally arranged by arranging the plurality of lens substrates side by side in the first direction.

Further, the coefficients of linear expansion of the lens substrates and the support member may be the same or approximately the same. Such as structure makes it possible to obtain a lens array in which distortion due to a temperature change is discouraged. In this structure, two adjacent lens substrates in the first direction may be side by side while abutting on each other.

The plurality of lens substrates may be arranged in the first direction side by side with gaps from each other. In such a structure, the gaps can absorb distortion with a temperature change attributable to a difference between the coefficient of thermal expansion of the lens substrates and that of the clear substrate, which improves the accuracy of relative position of the lenses in the lens array despite a temperature change.

Further, the plurality of lens substrates may be arranged in the first direction side by side with gaps from each other, and the plurality of gaps formed on the both surfaces of the clear substrate may be shifted from each other in the first direction. In this structure, the influence on the accuracy of position exerted by the gaps is dispersed because of the shifting of the gaps between the both surfaces of the clear substrate. It is therefore possible to obtain the lens array in which the accuracy of relative position of the lenses is improved.

The gaps may be filled with a light absorbing material.

Further, the lens substrates may be bonded to the support member by an adhesive. The adhesive may be a thermosetting resin or an ultraviolet cure adhesive. Using an ultraviolet cure adhesive, it is possible to bond the support member and the lens substrates to each other under UV light after aligning the support member and the lens substrates to each other.

An advantage of some aspects of the invention is to solve the above problems at least partially. The invention may be implemented as the following examples or applications.

FIRST EXAMPLE OF APPLICATION

A microlens array which comprises: a plurality of lens substrates which include a plurality of imaging lenses; and a base substrate which includes the plurality of lens substrates in which the lens substrates adjacent to each other are arranged thereon with gaps from each other.

In this example of application, since the microlens array is formed by the divided lens substrates, the lens substrates are small. Accordingly, the size of a mold for forming the imaging lenses is reduced. Hence, it is possible to obtain a microlens array in which the manufacturing cost is lowered and the accuracy of relative position of the lenses is improved. In addition, the gaps between the mutually adjacent lens substrates can absorb distortion due to the coefficient of thermal expansion of the lens substrates, which maintains the accuracy of relative position of the lenses regardless of a temperature change in the microlens array.

SECOND EXAMPLE OF APPLICATION

The above microlens array in which the plurality of lens substrates are arranged on the both surfaces of the base substrate. In this example of application, since the plurality of lens substrates on the both surfaces of the base substrate can be disposed using the base substrate as a reference, the accuracy of positions of the lens substrates relative to each other is improved. Hence, it is possible to obtain a microlens array in which the accuracy of relative position of the lenses is improved.

THIRD EXAMPLE OF APPLICATION

The above microlens array in which the positions of the gaps relative to the base substrate are shifted between the both surfaces. In this example of application, the influence on the accuracy of position exerted by the gaps between the lens substrates is dispersed because of the shifting of the gaps between the both surfaces of the clear substrate. It is therefore possible to obtain a microlens array in which the accuracy of relative position of the lenses is even better.

FOURTH EXAMPLE OF APPLICATION

A line head which comprises a substrate, a microlens array, and a light shielding member which is provided between the substrate and the microlens array. The microlens array includes a plurality of light emitting element groups, a plurality of imaging lenses, a plurality of lens substrates on which the plurality of imaging lenses are arranged, and a base substrate on which the plurality of lens substrates are arranged such that the lens substrates adjacent to each other are arranged with gaps from each other. The plurality of light emitting element groups include a plurality of light emitting elements and are arranged side by side on the substrate. The plurality of imaging lenses are arranged opposed to the light emitting element groups on a one-to-one correspondence and image upon a surface-to-be-scanned light emitted from the plurality of light emitting elements belonging to the corresponding light emitting element groups.

According to this example of application, it is possible to obtain a line head which realizes the effects described above.

FIFTH EXAMPLE OF APPLICATION

The above line head in which the plurality of lens substrates are provided on the both surfaces of the base substrate. According to this example of application, it is possible to obtain a line head which realizes the effects described above.

SIXTH EXAMPLE OF APPLICATION

The above line head in which positions of the gaps relative to the base substrate are shifted between the both surfaces. According to this example of application, it is possible to obtain a line head which realizes the effects described above.

SEVENTH EXAMPLE OF APPLICATION

The above line head in which the light shielding member serves also as the base substrate. According to this example of application, it is possible to obtain a line head which realizes the effects described above.

EIGHTH EXAMPLE OF APPLICATION

An image forming apparatus comprising a latent image carrier whose surface is transported in a sub scanning direction and an exposure unit which forms, the surface of the latent image carrier as the surface-to-be-scanned, spots on the latent image carrier surface and has the same structure as any one of the above line heads.

According to this example of application, it is possible to obtain an image forming apparatus which realizes the effects described above.

Modifications

Figure 18:
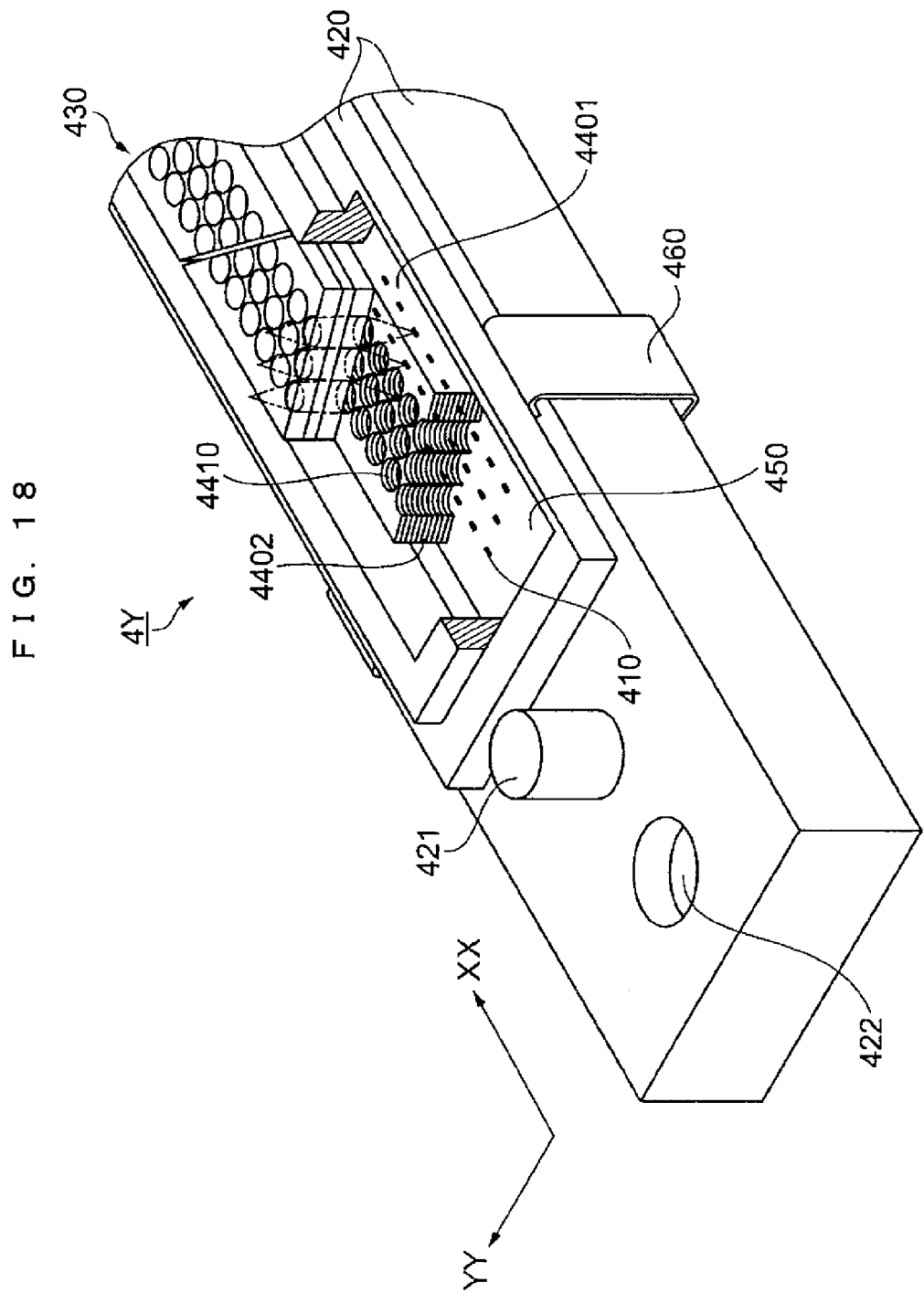
FIG. 18 is a perspective view schematically showing the line head of a modification.

The embodiments above and modifications thereof are not limiting. To the extent not deviating from the intention, further various modifications other than the above may be implemented. For example, the light shielding member 4401 of the line head 4Y may be a stack of light shielding plates 4402 as shown in FIG. 18.

Further, for the purpose of preventing reflection of light, light absorbing layers which absorb light may be provided on the inner surfaces of the light guide holes 4410 and the like. The light absorbing layers may be matte-black paint layers, chromium plated layers, galvanized layers, nickel plated layers, nickel-phosphorus plated layers, copper oxide layers, black alumite-treated layers, black membranes of diamond-like carbon or the like, etc.

Further, in the above embodiments, the light emitting element groups 410 are two dimensionally arranged such that three light emitting element group rows L411 (group rows), in each of which a specified number (two or more) of light emitting element groups 410 are aligned in the main scanning direction XX, are arranged in the sub scanning direction YY. However, the arrangement mode of the plurality of light emitting element groups 410 is not limited to this and can be suitably changed.

In the above embodiments, a plurality of spots are formed side by side in a straight line in the main scanning direction XX as shown in FIG. 8 using the line head. However, such a spot forming operation is only an example of the operation of the line head, and operations executable by the line head are not limited to this. In other words, spots to be formed need not be formed side by side along a straight line in the main scanning direction XX and, for example, may be formed side by side along a line at a specified angle to the main scanning direction XX or may be formed in a zigzag or wavy manner.

Although the invention is applied to the color image forming apparatuses in the above respective embodiments and modifications, the application subject of the invention is not limited to this and the invention is also applicable to monochromatic image forming apparatuses for forming so-called monochromatic images. Further, the invention is applicable not only to image forming apparatuses using the liquid toner in which toner particles are dispersed in the nonvolatile liquid carrier, but also to image forming apparatuses using a dry toner.

Further, the lens substrates 437 and the like are mounted to the glass substrate 431 by the adhesive in the embodiments above. However, a method of mounting the lens substrates 437 and the like is not limited to this.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A lens array, comprising:
a plurality of lens substrates which each include a plurality of lenses arranged in a first direction; and
a support member which supports the plurality of lens substrates arranged in the first direction.

2. The lens array of claim 1, wherein
the support member is a clear substrate, and
the plurality of lens substrates are arranged side by side in the first direction on at least one surface of two surfaces of the clear substrate.

3. The lens array of claim 2, wherein the plurality of lens substrates are arranged side by side on each one of the two surfaces of the clear substrate.

4. The lens array of claim 3, wherein
the plurality of lens substrates are arranged in the first direction side by side with gaps from each other, and
the plurality of gaps formed on the two surfaces of the clear substrate are shifted from each other in the first direction.

5. The lens array of claim 2, wherein the clear substrate is a glass substrate.

6. The lens array of claim 1, wherein
in the lens substrates, the plurality of lenses are further arranged in an arranging direction different from the first direction to constitute a lens column, and
a plurality of the lens columns are arranged in the first direction.

7. The lens array of claim 6, wherein the arranging direction is oblique with respect to a second direction which is orthogonal to the first direction.

8. The lens array of claim 6, wherein the arranging direction is parallel or approximately parallel to a second direction which is orthogonal to the first direction.

9. The lens array of claim 6, wherein an edge of the lens substrates in the first direction is parallel or approximately parallel to the arranging direction.

10. The lens array of claim 9, wherein the coefficients of linear expansion of the lens substrates and the support member are the same or approximately the same.

11. The lens array of claim 10, wherein the two adjacent lens substrates in the first direction are arranged side by side abutting on each other.

12. The lens array of claim 1, wherein the plurality of lens substrates are arranged in the first direction side by side with gaps from each other.

13. The lens array of claim 12, wherein the gaps are filled with a light absorbing material.

14. The lens array of claim 1, wherein the lens substrates are bonded to the support member by an adhesive.

15. The lens array of claim 14, wherein the adhesive is a thermosetting adhesive.

16. The lens array of claim 14, wherein the adhesive is an ultraviolet cure adhesive.

17. A line head, comprising:
a head substrate which includes a plurality of light emitting element groups each of which is a group of a plurality of light emitting elements; and
a lens array which includes a plurality of lens substrates which include a plurality of lenses arranged in a first direction and for each light emitting element group, and a support member which supports the plurality of lens substrates arranged in the first direction.

18. A line head, comprising:
a head substrate which includes a plurality of light emitting element groups each of which is a group of a plurality of light emitting elements;
a lens array which includes a plurality of lens substrates arranged in a first direction which include a plurality of lenses arranged in the first direction and for each light emitting element group; and
a shielding member which is disposed between the lens array and the head substrate, includes light guiding holes which extend from the light emitting element groups toward the lenses, and supports the plurality of lens substrates arranged in the first direction.

19. An image forming apparatus, comprising:
a latent image carrier;
a head substrate which includes a plurality of light emitting element groups each of which is a group of a plurality of light emitting elements; and
a lens array which includes a plurality of lens substrates which include a plurality of lenses arranged in a first direction and for each light emitting element group, and a support member which supports the plurality of lens substrates arranged in the first direction, the lenses focusing light from the light emitting elements to form spots on a surface of the latent image carrier.

20. An image forming apparatus, comprising:

a latent image carrier;

a head substrate which includes a plurality of light emitting element groups each of which is a group of a plurality of light emitting elements;

a lens array which includes a plurality of lens substrates arranged in a first direction which include a plurality of lenses arranged in the first direction and for each light emitting element group; and a shielding member which is disposed between the lens array and the head substrate, includes light guiding holes which extend from the light emitting element groups toward the lenses, and supports the plurality of lens substrates arranged in the first direction, the lenses focusing light from the light emitting elements to form spots on a surface of the latent image carrier.

* * * * *